(12) United States Patent
Rivard et al.

(10) Patent No.: US 11,356,647 B2
(45) Date of Patent: *Jun. 7, 2022

(54) SYSTEMS AND METHODS FOR GENERATING A DIGITAL IMAGE

(71) Applicant: Duelight LLC, Sunnyvale, CA (US)

(72) Inventors: William Rivard, Menlo Park, CA (US); Adam Feder, Mountain View, CA (US); Brian Kindle, Sunnyvale, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,915

(22) Filed: Jan. 8, 2021

(65) Prior Publication Data

US 2021/0274142 A1 Sep. 2, 2021

Related U.S. Application Data

(63) Continuation of application No. 16/505,278, filed on Jul. 8, 2019, now Pat. No. 10,904,505, which is a
(Continued)

(51) Int. Cl.
*H04N 9/73* (2006.01)
*H04N 9/77* (2006.01)
(Continued)

(52) U.S. Cl.
CPC ............. *H04N 9/77* (2013.01); *H04N 5/2256* (2013.01); *H04N 5/2257* (2013.01);
(Continued)

(58) Field of Classification Search
CPC ........... H04N 5/23206; H04N 5/23216; H04N 5/2354; H04N 5/2257; H04N 5/247;
(Continued)

(56) References Cited

U.S. PATENT DOCUMENTS 4,873,561 A 10/1989 Wen
5,200,828 A 4/1993 Jang et al.
(Continued)

FOREIGN PATENT DOCUMENTS

CN 101290388 A 10/2008
CN 101408709 A 4/2009
(Continued)

OTHER PUBLICATIONS

Corrected Notice of Allowance from U.S. Appl. No. 16/857,016, dated Apr. 13, 2021.
(Continued)

*Primary Examiner* — Kelly L Jerabek
(74) *Attorney, Agent, or Firm* — Zilka-Kotab, P.C.

(57) ABSTRACT

A system, method, and computer program product for generating a digital image is disclosed. In use, a first image and a second image are received from a first image sensor, where the first image sensor detects wavelengths of a visible spectrum. A third image and a fourth image are received from a second image sensor, where the second image sensor detects wavelengths of a non-visible spectrum. Using an image processing subsystem, a resulting image is generated by combining at least three of: the first image, the second image, the third image, or the fourth image.

19 Claims, 18 Drawing Sheets

Related U.S. Application Data continuation of application No. 16/154,999, filed on Oct. 9, 2018, now Pat. No. 10,375,369, which is a continuation of application No. 15/885,296, filed on Jan. 31, 2018, now Pat. No. 10,129,514, which is a continuation of application No. 15/352,510, filed on Nov. 15, 2016, now Pat. No. 9,912,928, which is a continuation of application No. 14/702,549, filed on May 1, 2015, now Pat. No. 9,531,961.

(51) Int. Cl.
| | | |
|---|---|---|
| H04N 5/247 | (2006.01) | |
| H04N 5/225 | (2006.01) | |
| H04N 5/232 | (2006.01) | |
| H04N 5/235 | (2006.01) | |
| H04N 9/09 | (2006.01) | |
| H04N 9/097 | (2006.01) | |
| H04N 9/04 | (2006.01) | |

(52) U.S. Cl.
CPC ......... *H04N 5/2258* (2013.01); *H04N 5/2354* (2013.01); *H04N 5/23206* (2013.01); *H04N 5/232933* (2018.08); *H04N 5/247* (2013.01); *H04N 9/09* (2013.01); *H04N 9/097* (2013.01); *H04N 9/735* (2013.01); *H04N 5/23216* (2013.01); *H04N 9/04515* (2018.08)

(58) Field of Classification Search
CPC ........... H04N 5/2258; H04N 5/232933; H04N 5/23232; H04N 5/2256; H04N 5/2356; H04N 5/2355; H04N 5/355; H04N 5/35536; H04N 5/35545; H04N 5/35554; H04N 5/35563; H04N 5/35572; H04N 5/35581; H04N 9/735; H04N 9/77; H04N 9/09; H04N 9/097; H04N 9/04515; G06T 5/009; G06T 2207/10004; G06T 2207/20208
See application file for complete search history.

(56) References Cited

U.S. PATENT DOCUMENTS

| | | |
|---|---|---|
| 5,363,209 A | 11/1994 | Eschbach et al. |
| 5,818,977 A | 10/1998 | Tansley |
| 5,867,215 A | 2/1999 | Kaplan |
| 6,115,065 A | 9/2000 | Yadid-Pecht et al. |
| 6,184,940 B1 | 2/2001 | Sano |
| 6,243,430 B1 | 6/2001 | Mathe |
| 6,365,950 B1 | 4/2002 | Sohn |
| 6,453,068 B1 | 9/2002 | Li |
| 6,498,926 B1 | 12/2002 | Ciccarelli et al. |
| 6,642,962 B1 | 11/2003 | Lin et al. |
| 6,788,338 B1 | 9/2004 | Dinev et al. |
| 6,996,186 B2 | 2/2006 | Ngai et al. |
| 7,084,905 B1 | 8/2006 | Nayar et al. |
| 7,088,351 B2 | 8/2006 | Wang |
| 7,098,952 B2 | 8/2006 | Morris et al. |
| 7,206,449 B2 | 4/2007 | Raskar et al. |
| 7,256,381 B2 | 8/2007 | Asaba |
| 7,265,784 B1 | 9/2007 | Frank |
| 7,518,645 B2 | 4/2009 | Farrier |
| 7,587,099 B2 | 9/2009 | Szeliski et al. |
| 7,599,569 B2 | 10/2009 | Smirnov et al. |
| 7,760,246 B2 | 7/2010 | Dalton et al. |
| 7,835,586 B2 | 11/2010 | Porikli |
| 7,907,791 B2 | 3/2011 | Kinrot et al. |
| 7,999,858 B2 | 8/2011 | Nayar et al. |
| 8,144,253 B2 | 3/2012 | Su et al. |
| 8,189,944 B1 | 5/2012 | Lim |
| 8,610,789 B2 | 12/2013 | Nayar et al. |
| 8,675,086 B2 | 3/2014 | Linzer |
| 8,723,284 B1 | 5/2014 | Hynecek |
| 8,761,245 B2 | 6/2014 | Puri et al. |
| 8,780,420 B1 | 7/2014 | Bluzer et al. |
| 8,811,757 B2 | 8/2014 | Batur |
| 8,854,421 B2 | 10/2014 | Kasahara |
| 8,878,963 B2 | 11/2014 | Prabhudesai et al. |
| 8,934,029 B2 | 1/2015 | Nayar et al. |
| 8,976,264 B2 | 3/2015 | Rivard et al. |
| 9,014,459 B2 | 4/2015 | Xiang et al. |
| 9,070,185 B2 | 6/2015 | Lee et al. |
| 9,083,905 B2 | 7/2015 | Wan et al. |
| 9,106,888 B2 | 8/2015 | Chou |
| 9,137,455 B1 | 9/2015 | Rivard et al. |
| 9,154,708 B1 | 10/2015 | Rivard et al. |
| 9,160,936 B1 | 10/2015 | Rivard et al. |
| 9,167,169 B1 | 10/2015 | Rivard et al. |
| 9,179,062 B1 | 11/2015 | Rivard et al. |
| 9,179,085 B1 | 11/2015 | Rivard et al. |
| 9,336,574 B2 | 5/2016 | Zhang et al. |
| 9,406,147 B2 | 8/2016 | Rivard et al. |
| 9,531,961 B2 | 12/2016 | Rivard et al. |
| 9,560,269 B2 | 1/2017 | Baldwin |
| 9,578,211 B2 | 2/2017 | Kong et al. |
| 9,600,741 B1 | 3/2017 | Su et al. |
| 9,661,327 B2 | 5/2017 | Nilsson |
| 9,807,322 B2 | 10/2017 | Feder et al. |
| 9,819,849 B1 | 11/2017 | Rivard et al. |
| 9,860,461 B2 | 1/2018 | Feder et al. |
| 9,912,928 B2 | 3/2018 | Rivard et al. |
| 9,918,017 B2 | 3/2018 | Rivard et al. |
| 9,998,721 B2 | 6/2018 | Rivard et al. |
| 10,110,870 B2 | 10/2018 | Rivard et al. |
| 10,129,514 B2 | 11/2018 | Rivard et al. |
| 10,178,300 B2 | 1/2019 | Rivard et al. |
| 10,182,197 B2 | 1/2019 | Feder et al. |
| 10,270,958 B2 | 4/2019 | Rivard et al. |
| 10,372,971 B2 | 8/2019 | Rivard et al. |
| 10,375,369 B2 | 8/2019 | Rivard et al. |
| 10,382,702 B2 | 8/2019 | Rivard et al. |
| 10,469,714 B2 | 11/2019 | Rivard et al. |
| 10,477,077 B2 | 11/2019 | Rivard et al. |
| 10,498,982 B2 | 12/2019 | Feder et al. |
| 10,558,848 B2 | 2/2020 | Rivard et al. |
| 10,586,097 B2 | 3/2020 | Rivard et al. |
| 10,652,478 B2 | 5/2020 | Rivard et al. |
| 10,785,401 B2 | 9/2020 | Rivard et al. |
| 10,904,505 B2 * | 1/2021 | Rivard ............... H04N 5/23206 |
| 10,924,688 B2 | 2/2021 | Rivard et al. |
| 10,931,897 B2 | 2/2021 | Feder et al. |
| 11,025,831 B2 | 6/2021 | Rivard et al. |
| 2003/0015645 A1 | 1/2003 | Bricked et al. |
| 2003/0142745 A1 | 7/2003 | Osawa |
| 2003/0184660 A1 | 10/2003 | Skow |
| 2004/0027471 A1 | 2/2004 | Koseki et al. |
| 2004/0181375 A1 | 9/2004 | Szu et al. |
| 2004/0184677 A1 | 9/2004 | Raskar et al. |
| 2004/0252199 A1 | 12/2004 | Cheung et al. |
| 2004/0263510 A1 | 12/2004 | Marschner et al. |
| 2005/0088570 A1 | 4/2005 | Seo |
| 2005/0134723 A1 | 6/2005 | Lee et al. |
| 2005/0180657 A1 | 8/2005 | Zhang et al. |
| 2006/0015308 A1 | 1/2006 | Marschner et al. |
| 2006/0050165 A1 | 3/2006 | Amano |
| 2006/0087702 A1 | 4/2006 | Satoh et al. |
| 2006/0181614 A1 | 8/2006 | Yen et al. |
| 2006/0192785 A1 | 8/2006 | Marschner et al. |
| 2006/0245014 A1 | 11/2006 | Haneda |
| 2007/0023798 A1 | 2/2007 | McKee |
| 2007/0025714 A1 | 2/2007 | Shiraki |
| 2007/0025717 A1 | 2/2007 | Raskar et al. |
| 2007/0030357 A1 | 2/2007 | Levien et al. |
| 2007/0110305 A1 | 5/2007 | Corcoran et al. |
| 2007/0242900 A1 | 10/2007 | Chen et al. |
| 2007/0248342 A1 | 10/2007 | Tamminen et al. |
| 2007/0263106 A1 | 11/2007 | Tanaka et al. |
| 2008/0018763 A1 | 1/2008 | Sato |
| 2008/0030592 A1 | 2/2008 | Border et al. |
| 2008/0107411 A1 | 5/2008 | Hope |
| 2008/0151097 A1 | 6/2008 | Chen et al. |

(56) References Cited

U.S. PATENT DOCUMENTS

| | | |
|---|---|---|
| 2008/0158398 A1 | 7/2008 | Yaffe et al. |
| 2008/0170160 A1 | 7/2008 | Lukac |
| 2008/0192064 A1 | 8/2008 | Hong et al. |
| 2009/0002475 A1 | 1/2009 | Jelley et al. |
| 2009/0066782 A1 | 3/2009 | Choi et al. |
| 2009/0153245 A1 | 6/2009 | Lee |
| 2009/0160992 A1 | 6/2009 | Inaba et al. |
| 2009/0175555 A1 | 7/2009 | Mahowald |
| 2009/0278922 A1 | 11/2009 | Tinker et al. |
| 2009/0295941 A1 | 12/2009 | Nakajima et al. |
| 2009/0309990 A1 | 12/2009 | Levoy et al. |
| 2009/0309994 A1 | 12/2009 | Inoue |
| 2009/0322903 A1 | 12/2009 | Hashimoto et al. |
| 2010/0073499 A1 | 3/2010 | Gere |
| 2010/0118204 A1 | 5/2010 | Proca et al. |
| 2010/0165178 A1 | 7/2010 | Chou et al. |
| 2010/0165181 A1 | 7/2010 | Murakami et al. |
| 2010/0182465 A1 | 7/2010 | Okita |
| 2010/0194851 A1 | 8/2010 | Pasupaleti et al. |
| 2010/0194963 A1 | 8/2010 | Terashima |
| 2010/0201831 A1 | 8/2010 | Weinstein |
| 2010/0208099 A1 | 8/2010 | Nomura |
| 2010/0231747 A1 | 9/2010 | Yim |
| 2010/0265079 A1 | 10/2010 | Yin |
| 2010/0302407 A1 | 12/2010 | Ayers et al. |
| 2011/0019051 A1 | 1/2011 | Yin et al. |
| 2011/0090385 A1 | 4/2011 | Aoyama et al. |
| 2011/0096192 A1 | 4/2011 | Niikura |
| 2011/0115971 A1 | 5/2011 | Furuya et al. |
| 2011/0134267 A1 | 6/2011 | Ohya |
| 2011/0150332 A1 | 6/2011 | Sibiryakov et al. |
| 2011/0194618 A1 | 8/2011 | Gish et al. |
| 2011/0242334 A1 | 10/2011 | Wilburn et al. |
| 2011/0279698 A1 | 11/2011 | Yoshikawa |
| 2011/0280541 A1 | 11/2011 | Lee |
| 2012/0002082 A1 | 1/2012 | Johnson et al. |
| 2012/0002089 A1 | 1/2012 | Wang et al. |
| 2012/0008011 A1 | 1/2012 | Garcia Manchado |
| 2012/0033118 A1 | 2/2012 | Lee et al. |
| 2012/0057786 A1 | 3/2012 | Yano |
| 2012/0069213 A1 | 3/2012 | Jannard et al. |
| 2012/0105584 A1 | 5/2012 | Gallagher et al. |
| 2012/0154541 A1 | 6/2012 | Scott |
| 2012/0154627 A1 | 6/2012 | Rivard et al. |
| 2012/0162465 A1 | 6/2012 | Culbert et al. |
| 2012/0177352 A1 | 7/2012 | Pillman et al. |
| 2012/0188392 A1 | 7/2012 | Smith |
| 2012/0206582 A1 | 8/2012 | DiCarlo et al. |
| 2012/0212661 A1 | 8/2012 | Yamaguchi et al. |
| 2012/0242844 A1 | 9/2012 | Walker et al. |
| 2012/0242886 A1 | 9/2012 | Kawarada |
| 2012/0262600 A1 | 10/2012 | Velarde et al. |
| 2012/0274806 A1 | 11/2012 | Mori |
| 2012/0287223 A1 | 11/2012 | Zhang et al. |
| 2012/0314100 A1 | 12/2012 | Frank |
| 2013/0010075 A1 | 1/2013 | Gallagher et al. |
| 2013/0021447 A1 | 1/2013 | Brisedoux et al. |
| 2013/0027580 A1 | 1/2013 | Olsen et al. |
| 2013/0050520 A1 | 2/2013 | Takeuchi |
| 2013/0070145 A1 | 3/2013 | Matsuyama |
| 2013/0107062 A1 | 5/2013 | Okazaki |
| 2013/0114894 A1 | 5/2013 | Yadav et al. |
| 2013/0140435 A1 | 6/2013 | Kikuchi |
| 2013/0147979 A1 | 6/2013 | McMahon et al. |
| 2013/0148013 A1 | 6/2013 | Shiohara |
| 2013/0176458 A1 | 7/2013 | Van Dalen et al. |
| 2013/0194963 A1 | 8/2013 | Hampel |
| 2013/0223530 A1 | 8/2013 | Demos |
| 2013/0228673 A1 | 9/2013 | Hashimoto et al. |
| 2013/0235068 A1 | 9/2013 | Ubillos et al. |
| 2013/0271631 A1 | 10/2013 | Tatsuzawa et al. |
| 2013/0278798 A1* | 10/2013 | Hattori ............... H04N 5/2353 348/234 |
| 2013/0279584 A1 | 10/2013 | Demos |
| 2013/0293744 A1 | 11/2013 | Attar et al. |
| 2013/0301729 A1 | 11/2013 | Demos |
| 2013/0335596 A1 | 12/2013 | Demandolx et al. |
| 2013/0342526 A1 | 12/2013 | Ng et al. |
| 2013/0342740 A1 | 12/2013 | Govindarao |
| 2014/0009636 A1 | 1/2014 | Lee et al. |
| 2014/0063287 A1 | 3/2014 | Yamada |
| 2014/0063301 A1 | 3/2014 | Solhusvik |
| 2014/0098248 A1 | 4/2014 | Okazaki |
| 2014/0168468 A1 | 6/2014 | Levoy et al. |
| 2014/0176757 A1 | 6/2014 | Rivard et al. |
| 2014/0184894 A1 | 7/2014 | Motta |
| 2014/0192216 A1 | 7/2014 | Matsumoto |
| 2014/0192267 A1 | 7/2014 | Biswas et al. |
| 2014/0193088 A1 | 7/2014 | Capata et al. |
| 2014/0198242 A1 | 7/2014 | Weng et al. |
| 2014/0211852 A1 | 7/2014 | Demos |
| 2014/0244858 A1 | 8/2014 | Okazaki |
| 2014/0247979 A1 | 9/2014 | Roffet et al. |
| 2014/0267869 A1 | 9/2014 | Sawa |
| 2014/0300795 A1 | 10/2014 | Bilcu et al. |
| 2014/0301642 A1 | 10/2014 | Muninder |
| 2014/0310788 A1 | 10/2014 | Ricci |
| 2014/0354781 A1 | 12/2014 | Matsuyama |
| 2015/0005637 A1 | 1/2015 | Stegman et al. |
| 2015/0077581 A1 | 3/2015 | Baltz et al. |
| 2015/0092852 A1 | 4/2015 | Demos |
| 2015/0098651 A1 | 4/2015 | Rivard et al. |
| 2015/0103192 A1 | 4/2015 | Venkatraman et al. |
| 2015/0138366 A1 | 5/2015 | Keelan et al. |
| 2015/0222809 A1 | 8/2015 | Osuka et al. |
| 2015/0229819 A1 | 8/2015 | Rivard et al. |
| 2015/0279113 A1 | 10/2015 | Knorr et al. |
| 2015/0334318 A1 | 11/2015 | Georgiev et al. |
| 2015/0341593 A1 | 11/2015 | Zhang et al. |
| 2016/0028948 A1 | 1/2016 | Omori et al. |
| 2016/0065926 A1 | 3/2016 | Nonaka et al. |
| 2016/0071289 A1 | 3/2016 | Kobayashi et al. |
| 2016/0086318 A1 | 3/2016 | Hannuksela et al. |
| 2016/0142610 A1 | 5/2016 | Rivard et al. |
| 2016/0150147 A1 | 5/2016 | Shioya |
| 2016/0150175 A1 | 5/2016 | Hynecek |
| 2016/0219211 A1 | 7/2016 | Katayama |
| 2016/0248968 A1 | 8/2016 | Baldwin |
| 2016/0284065 A1 | 9/2016 | Cohen |
| 2016/0316154 A1 | 10/2016 | Elmfors et al. |
| 2016/0323518 A1 | 11/2016 | Rivard et al. |
| 2016/0381304 A9 | 12/2016 | Feder et al. |
| 2017/0048442 A1 | 2/2017 | Cote et al. |
| 2017/0054966 A1 | 2/2017 | Zhou et al. |
| 2017/0061234 A1 | 3/2017 | Lim et al. |
| 2017/0061236 A1 | 3/2017 | Pope |
| 2017/0061567 A1 | 3/2017 | Lim et al. |
| 2017/0064192 A1 | 3/2017 | Mori |
| 2017/0064227 A1 | 3/2017 | Lin et al. |
| 2017/0064276 A1 | 3/2017 | Rivard et al. |
| 2017/0070690 A1 | 3/2017 | Feder et al. |
| 2017/0076430 A1 | 3/2017 | Xu |
| 2017/0085785 A1 | 3/2017 | Corcoran et al. |
| 2017/0109931 A1 | 4/2017 | Knorr et al. |
| 2017/0302903 A1 | 10/2017 | Ng et al. |
| 2017/0364752 A1 | 12/2017 | Zhou et al. |
| 2017/0374336 A1 | 12/2017 | Rivard et al. |
| 2018/0007240 A1 | 1/2018 | Rivard et al. |
| 2018/0063409 A1 | 3/2018 | Rivard et al. |
| 2018/0063411 A1 | 3/2018 | Rivard et al. |
| 2018/0077367 A1 | 3/2018 | Feder et al. |
| 2018/0160092 A1 | 6/2018 | Rivard et al. |
| 2018/0183989 A1 | 6/2018 | Rivard et al. |
| 2019/0045165 A1 | 2/2019 | Rivard et al. |
| 2019/0108387 A1 | 4/2019 | Rivard et al. |
| 2019/0108388 A1 | 4/2019 | Rivard et al. |
| 2019/0116306 A1 | 4/2019 | Rivard et al. |
| 2019/0124280 A1 | 4/2019 | Feder et al. |
| 2019/0174028 A1 | 6/2019 | Rivard et al. |
| 2019/0179594 A1 | 6/2019 | Alameh et al. |
| 2019/0197297 A1 | 6/2019 | Rivard et al. |
| 2019/0335151 A1 | 10/2019 | Rivard et al. |
| 2019/0349510 A1 | 11/2019 | Rivard et al. |
| 2020/0029008 A1 | 1/2020 | Rivard et al. |

(56) References Cited

U.S. PATENT DOCUMENTS

| | | | |
|---|---|---|---|
| 2020/0059575 | A1 | 2/2020 | Rivard et al. |
| 2020/0084398 | A1 | 3/2020 | Feder et al. |
| 2020/0193144 | A1 | 6/2020 | Rivard et al. |
| 2020/0259991 | A1 | 8/2020 | Rivard et al. |
| 2021/0037178 | A1 | 2/2021 | Rivard et al. |
| 2021/0314507 | A1 | 10/2021 | Feder et al. |
| 2021/0337104 | A1 | 10/2021 | Rivard et al. |
| 2021/0360141 | A1 | 11/2021 | Rivard et al. |

FOREIGN PATENT DOCUMENTS

| | | | |
|---|---|---|---|
| CN | 102053453 | A | 5/2011 |
| CN | 102165783 | A | 8/2011 |
| CN | 103152519 | A | 6/2013 |
| CN | 103813098 | A | 5/2014 |
| CN | 204316606 | U | 5/2015 |
| CN | 105026955 | A | 11/2015 |
| DE | 102011107844 | A1 | 1/2013 |
| EP | 2169946 | A2 | 3/2010 |
| EP | 2346079 | A1 | 7/2011 |
| EP | 2565843 | A2 | 3/2013 |
| EP | 2731326 | A2 | 5/2014 |
| GB | 2486878 | A | 7/2012 |
| GB | 2487943 | A | 8/2012 |
| JP | 2000278532 | A | 10/2000 |
| JP | 2002112008 | A | 4/2002 |
| JP | 2003101886 | A | 4/2003 |
| JP | 2004247983 | A | 9/2004 |
| JP | 2004248061 | A | 9/2004 |
| JP | 2004326119 | A | 11/2004 |
| JP | 2004328532 | A | 11/2004 |
| JP | 2006080752 | A | 3/2006 |
| JP | 2006121612 | A | 5/2006 |
| JP | 2007035028 | A | 2/2007 |
| JP | 2008236726 | A | 10/2008 |
| JP | 2009267923 | A | 11/2009 |
| JP | 2009303010 | A | 12/2009 |
| JP | 2010016416 | A | 1/2010 |
| JP | 2010136224 | A | 6/2010 |
| JP | 2010157925 | A | 7/2010 |
| JP | 2010166281 | A | 7/2010 |
| JP | 2010239317 | A | 10/2010 |
| JP | 4649623 | B2 | 3/2011 |
| JP | 2011097141 | A | 5/2011 |
| JP | 2011101180 | A | 5/2011 |
| JP | 2011120094 | A | 6/2011 |
| JP | 2011146957 | A | 7/2011 |
| JP | 2012156885 | A | 8/2012 |
| JP | 2012195660 | A | 10/2012 |
| JP | 2012213137 | A | 11/2012 |
| JP | 2013055610 | A | 3/2013 |
| JP | 2013066142 | A | 4/2013 |
| JP | 2013093875 | A | 5/2013 |
| JP | 2013120254 | A | 6/2013 |
| JP | 2013207327 | A | 10/2013 |
| JP | 2013219708 | A | 10/2013 |
| JP | 2013258444 | A | 12/2013 |
| JP | 2013258510 | A | 12/2013 |
| JP | 2014057256 | A | 3/2014 |
| JP | 2014140247 | A | 7/2014 |
| JP | 2014142836 | A | 8/2014 |
| JP | 2014155033 | A | 8/2014 |
| KR | 20100094200 | A | 8/2010 |
| WO | 9746001 | A1 | 12/1997 |
| WO | 0237830 | A2 | 5/2002 |
| WO | 2004064391 | A1 | 7/2004 |
| WO | 2008010559 | A1 | 1/2008 |
| WO | 2009074938 | A2 | 6/2009 |
| WO | 2009074938 | A3 | 8/2009 |
| WO | 2014172059 | A2 | 10/2014 |
| WO | 2015120873 | A1 | 8/2015 |
| WO | 2015123455 | A1 | 8/2015 |
| WO | 2015173565 | A1 | 11/2015 |

OTHER PUBLICATIONS

Examination Report from European Application No. 16915389.7, dated Feb. 25, 2021.
Examination Report from European Application No. 15857386.5, dated Feb. 8, 2021.
Rivard et al., U.S. Appl. No. 17/321,166, filed May 14, 2021.
Notice of Allowance from U.S. Appl. No. 13/573,252, dated Oct. 22, 2014.
Non-Final Office Action from U.S. Appl. No. 13/573,252, dated Jul. 10, 2014.
Rivard, W. et al., U.S. Appl. No. 14/568,045, filed Dec. 11, 2014.
Restriction Requirement from U.S. Appl. No. 14/568,045, dated Jan. 15, 2015.
Rivard, W et al., U.S. Appl. No. 14/534,068, filed Nov. 5, 2014.
Non-Final Office Action from U.S. Appl. No. 14/534,068, dated Feb. 17, 2015.
Feder et al., U.S. Appl. No. 13/999,678, filed Mar. 14, 2014.
Rivard, W. et al., U.S. Appl. No. 14/534,079, filed Nov. 5, 2014.
Non-Final Office Action from U.S. Appl. No. 14/534,079, dated Jan. 29, 2015.
Rivard, W. et al., U.S. Appl. No. 14/534,089, filed Nov. 5, 2014.
Non-Final Office Action from U.S. Appl. No. 14/534,089, dated Feb. 25, 2015.
Rivard, W. et al., U.S. Appl. No. 14/535,274, filed Nov. 6, 2014.
Non-Final Office Action from U.S. Appl. No. 14/535,274, dated Feb. 3, 2015.
Rivard, W. et al., U.S. Appl. No. 14/535,279, filed Nov. 6, 2014.
Non-Final Office Action from U.S. Appl. No. 14/535,279, dated Feb. 5, 2015.
Rivard, W. et al., U.S. Appl. No. 14/535,282, filed Nov. 6, 2014.
Non-Final Office Action from U.S. Appl. No. 14/535,282, dated Jan. 30, 2015.
Non-Final Office Action from U.S. Appl. No. 14/536,524, dated Mar. 3, 2015.
Rivard, W et al., U.S. Appl. No. 14/536,524, filed Nov. 7, 2014.
Non-Final Office Action from U.S. Appl. No. 14/568,045, dated Mar. 24, 2015.
Rivard, W. et al., U.S. Appl. No. 14/702,549, filed May 1, 2015.
Notice of Allowance from U.S. Appl. No. 14/534,079, dated May 11, 2015.
Notice of Allowance from U.S. Appl. No. 14/535,274, dated May 26, 2015.
Notice of Allowance from U.S. Appl. No. 14/534,089, dated Jun. 23, 2015.
Notice of Allowance from U.S. Appl. No. 14/535,282, dated Jun. 23, 2015.
Notice of Allowance from U.S. Appl. No. 14/536,524, dated Jun. 29, 2015.
Notice of Allowance from U.S. Appl. No. 14/534,068, dated Jul. 29, 2015.
Notice of Allowance from U.S. Appl. No. 14/535,279, dated Aug. 31, 2015.
Final Office Action from U.S. Appl. No. 14/568,045, dated Sep. 18, 2015.
Non-Final Office Action from U.S. Appl. No. 13/999,678, dated Aug. 12, 2015.
International Search Report and Written Opinion from International Application No. PCT/US15/59348, dated Feb. 2, 2016.
International Search Report and Written Opinion from International Application No. PCT/US 15/59097, dated Jan. 4, 2016.
Non-Final Office Action from U.S. Appl. No. 14/702,549, dated Jan. 25, 2016.
Final Office Action from U.S. Appl. No. 13/999,678, dated Mar. 28, 2016.
International Search Report and Written Opinion from International Application No. PCT/US2015/060476, dated Feb. 10, 2016.
Notice of Allowance from U.S. Appl. No. 14/568,045, dated Apr. 26, 2016.
International Search Report and Written Opinion from International Application No. PCT/US2015/058895, dated Apr. 11, 2016.
Notice of Allowance from U.S. Appl. No. 14/568,045, dated Jan. 12, 2016.

(56) References Cited

OTHER PUBLICATIONS

International Search Report and Written Opinion from International Application No. PCT/US2015/059103, dated Dec. 21, 2015.
Final Office Action from U.S. Appl. No. 14/178,305, dated May 18, 2015.
Non-Final Office Action from U.S. Appl. No. 14/178,305, dated Aug. 11, 2014.
Non-Final Office Action from U.S. Appl. No. 14/823,993, dated Jul. 28, 2016.
International Search Report and Written Opinion from International Application No. PCT/US2015/059105, dated Jul. 26, 2016.
Notice of Allowance from U.S. Appl. No. 14/702,549, dated Aug. 15, 2016.
International Search Report and Written Opinion from International Application No. PCT/US2015/058896, dated Aug. 26, 2016.
International Search Report and Written Opinion from International Application No. PCT/US2015/058891, dated Aug. 26, 2016.
International Search Report and Written Opinion from International Application No. PCT/US2016/050011, dated Nov. 10, 2016.
Final Office Action from U.S. Appl. No. 14/823,993, dated Feb. 10, 2017.
Non-Final Office Action from U.S. Appl. No. 15/354,935, dated Feb. 8, 2017.
Non-Final Office Action from U.S. Appl. No. 13/999,678, dated Dec. 20, 2016.
Notice of Allowance from U.S. Appl. No. 16/857,016, dated Jan. 27, 2021.
Office Action from Japanese Patent Application No. 2017-544282, dated Jan. 5, 2021.
Office Action from Japanese Patent Application No. 2017-544283, dated Jan. 12, 2021.
Decision for Rejection and Decision of Dismissal of Amendment for Japanese Application No. 2017-544280, dated May 25, 2021.
Extended European Search Report from European Application No. 18864431.4, dated Jun. 1, 2021.
Kaufman et al., "Content-Aware Automatic Photo Enhancemen," Computer Graphics Forum, vol. 31, No. 08, 2012, pp. 2528-2540.
Battiato et al., "Automatic Image Enhancement by Content Dependent Exposure Correction," EURASIP Journal on Applied Signal Processing, 2004, pp. 1849-1860.
Mangiat et al., "Automatic scene relighting for video conferencing," IEEE 16th Annual International Conference on Image Processing (ICIP), Nov. 2009, pp. 2781-2784.
Weyrich et al., "Analysis of human faces using a measurement-based skin reflectance model," ACM Transactions on Graphics, vol. 25, No. 3, 2006, pp. 1013-1024.
Extended European Search Report from European Application No. 21169039.1, dated Jun. 16, 2021.
Office Action from Japanese Patent Application No. 2017-544284, dated Jul. 13, 2021.
Wan et al., "CMOS Image Sensors With Multi-Bucket Pixels for Computational Photography," IEEE Journal of Solid-State Circuits, vol. 47, No. 4, Apr. 2012, pp. 1031-1042.
Notice of Allowance from U.S. Appl. No. 15/201,283, dated Mar. 23, 2017.
Chatterjee et al., "Clustering-Based Denoising With Locally Learned Dictionaries," IEEE Transactions On Image Processing, vol. 18, No. 7, Jul. 2009, pp. 1-14.
Burger et al., "Image denoising: Can plain Neural Networks compete with BM3D?," Computer Vision and Pattern Recognition (CVPR), IEEE, 2012, pp. 4321-4328.
Kervann et al., "Optimal Spatial Adaptation for Patch-Based Image Denoising," IEEE Transactions on Image Processing, vol. 15, No. 10, Oct. 2006, pp. 2866-2878.
Foi et al., "Practical Poissonian-Gaussian noise modeling and fitting for single-image raw-data," IEEE Transactions, 2007, pp. 1-18.
International Search Report and Written Opinion from PCT Application No. PCT/US17/39946, dated Sep. 25, 2017.
Notice of Allowance from U.S. Appl. No. 15/201,283, dated Jul. 19, 2017.
Notice of Allowance from U.S. Appl. No. 15/354,935, dated Aug. 23, 2017.
Notice of Allowance from U.S. Appl. No. 14/823,993, dated Oct. 31, 2017.
Notice of Allowance from U.S. Appl. No. 15/352,510, dated Oct. 17, 2017.
European Office Communication and Exam Report from European Application No. 15856814.7, dated Dec. 14, 2017.
Supplemental Notice of Allowance from U.S. Appl. No. 15/354,935, dated Dec. 1, 2017.
European Office Communication and Exam Report from European Application No. 15856267.8, dated Dec. 12, 2017.
European Office Communication and Exam Report from European Application No. 15856710.7, dated Dec. 21, 2017.
European Office Communication and Exam Report from European Application No. 15857675.1, dated Dec. 21, 2017.
European Office Communication and Exam Report from European Application No. 15856212.4, dated Dec. 15, 2017.
Non-Final Office Action from U.S. Appl. No. 15/254,964, dated Jan. 3, 2018.
Non-Final Office Action from U.S. Appl. No. 15/643,311, dated Jan. 4, 2018.
European Office Communication and Exam Report from European Application No. 15857386.5, dated Jan. 11, 2018.
Kim et al., "A CMOS Image Sensor Based on Unified Pixel Architecture With Time-Division Multiplexing Scheme for Color and Depth Image Acquisition," IEEE Journal of Solid-State Circuits, vol. 47, No. 11, Nov. 2012, pp. 2834-2845.
European Office Communication and Exam Report from European Application No. 15857748.6, dated Jan. 10, 2018.
Non-Final Office Action from U.S. Appl. No. 15/814,238, dated Feb. 8, 2018.
Non-Final Office Action for U.S. Appl. No. 15/687,278, dated Apr. 13, 2018.
Non-Final Office Action from U.S. Appl. No. 15/836,655, dated Apr. 6, 2018.
Notice of Allowance from U.S. Appl. No. 15/836,655, dated Apr. 30, 2018.
Rivard, W. et al., U.S. Appl. No. 15/891,251, filed Feb. 7, 2018.
Rivard et al., U.S. Appl. No. 14/823,993, filed Aug. 11, 2015.
Rivard et al., U.S. Appl. No. 14/536,524, filed Nov. 7, 2014.
Extended European Search Report from European Application No. 15891394.7 dated Jun. 19, 2018.
Non-Final Office Action for U.S. Appl. No. 15/885,296, dated Jun. 4, 2018.
Non-Final Office Action for U.S. Appl. No. 15/891,251, dated May 31, 2018.
Notice of Allowance from U.S. Appl. No. 15/687,278, dated Aug. 24, 2018.
Final Office Action for U.S. Appl. No. 15/643,311 dated Jul. 24, 2018.
Notice of Allowance for U.S. Appl. No. 15/885,296 dated Sep. 21, 2018.
Final Office Action for U.S. Appl. No. 15/254,964 dated Jul. 24, 2018.
Notice of Allowance for U.S. Appl. No. 15/814,238 dated Oct. 4, 2018.
Corrected Notice of Allowance for U.S. Appl. No. 15/885,296 dated Oct. 16, 2018.
Rivard et al., U.S. Appl. No. 16/154,999, filed Oct. 9, 2018.
Non-Final Office Action for U.S. Appl. No. 15/636,324, dated Oct. 18, 2018.
Notice of Allowance for U.S. Appl. No. 15/643,311, dated Oct. 31, 2018.
Corrected Notice of Allowance for U.S. Appl. No. 15/814,238 dated Nov. 13, 2018.
Final Office Action for U.S. Appl. No. 15/891,251, dated Nov. 29, 2018.
Rivard et al., U.S. Appl. No. 16/215,351, filed Dec. 10, 2018.
Rivard et al., U.S. Appl. No. 16/213,041, filed Dec. 7, 2018.
Non-Final Office Action for U.S. Appl. No. 16/154,999, dated Dec. 20, 2018.

(56) References Cited

OTHER PUBLICATIONS

Notice of Allowance for U.S. Appl. No. 15/254,964, dated Dec. 21, 2018.
Supplemental Notice of Allowance for U.S. Appl. No. 15/643,311, dated Dec. 11, 2018.
Feder et al., U.S. Appl. No. 16/217,848, filed Dec. 12, 2018.
International Preliminary Examination Report from PCT Application No. PCT/US2017/39946, dated Jan. 10, 2019.
International Search Report and Written Opinion from International Application No. PCT/US 18/54014, dated Dec. 26, 2018.
Non-Final Office Action from U.S. Appl. No. 16/215,351, dated Jan. 24, 2019.
Supplemental Notice of Allowance for U.S. Appl. No. 15/254,964, dated Feb. 1, 2019.
Rivard et al., U.S. Appl. No. 16/290,763, filed Mar. 1, 2019.
Supplemental Notice of Allowance for U.S. Appl. No. 15/254,964, dated Mar. 11, 2019.
Rivard et al., U.S. Appl. No. 15/976,756, filed May 10, 2018.
Final Office Action for U.S. Appl. No. 15/636,324, dated Mar. 22, 2019.
Non-Final Office Action from U.S. Appl. No. 16/271,604, dated Apr. 5, 2019.
Notice of Allowance from U.S. Appl. No. 16/215,351, dated Apr. 1, 2019.
Rivard et al., U.S. Appl. No. 16/271,604, filed Feb. 8, 2019.
Non-Final Office Action for U.S. Appl. No. 15/636,324, dated Apr. 18, 2019.
Notice of Allowance from U.S. Appl. No. 15/891,251, dated May 7, 2019.
Notice of Allowance from U.S. Appl. No. 16/154,999, dated Jun. 7, 2019.
Corrected Notice of Allowance from U.S. Appl. No. 15/891,251, dated Jul. 3, 2019.
Notice of Allowance from U.S. Appl. No. 15/636,324, dated Jul. 2, 2019.
Notice of Allowance from U.S. Appl. No. 16/271,604, dated Jul. 2, 2019.
Non-Final Office Action for U.S. Appl. No. 15/976,756, dated Jun. 27, 2019.
Non-Final Office Action for U.S. Appl. No. 16/290,763, dated Jun. 26, 2019.
Rivard et al., U.S. Appl. No. 16/505,278, filed Jul. 8, 2019.
Rivard et al., U.S. Appl. No. 16/519,244, filed Jul. 23, 2019.
Notice of Allowance from U.S. Appl. No. 16/217,848, dated Jul. 31, 2019.
Corrected Notice of Allowance from U.S. Appl. No. 16/271,604, dated Aug. 8, 2019.
Corrected Notice of Allowance from U.S. Appl. No. 15/636,324, dated Aug. 20, 2019.
Office Action from Chinese Patent Application No. 201580079444.1, dated Aug. 1, 2019.
Corrected Notice of Allowance from U.S. Appl. No. 15/636,324, dated Sep. 5, 2019.
Corrected Notice of Allowance from U.S. Appl. No. 16/271,604, dated Sep. 19, 2019.
Non-Final Office Action for U.S. Appl. No. 16/519,244, dated Sep. 23, 2019.
Corrected Notice of Allowance from U.S. Appl. No. 16/217,848, dated Sep. 24, 2019.
Examination Report from European Application No. 15 856 814.7, dated Aug. 20, 2019.
Examination Report from European Application No. 15 857 675.1, dated Aug. 23, 2019.
Examination Report from European Application No. 15 856 710.7, dated Sep. 9, 2019.
Examination Report from European Application No. 15 857 386.5, dated Sep. 17, 2019.
Examination Report from European Application No. 15 857 748.6, dated Sep. 26, 2019.
Rivard et al., U.S. Appl. No. 16/584,486, filed Sep. 26, 2019.
Notice of Allowance from U.S. Appl. No. 15/976,756, dated Oct. 4, 2019.
Notice of Allowance from U.S. Appl. No. 16/290,763, dated Oct. 10, 2019.
Corrected Notice of Allowance from U.S. Appl. No. 16/217,848, dated Oct. 31, 2019.
Non-Final Office Action for U.S. Appl. No. 16/213,041, dated Oct. 30, 2019.
Office Action from Japanese Patent Application No. 2017-544279, dated Oct. 23, 2019.
Office Action from Japanese Patent Application No. 2017-544280, dated Oct. 29, 2019.
Office Action from Japanese Patent Application No. 2017-544283, dated Oct. 29, 2019.
Office Action from Japanese Patent Application No. 2017-544547, dated Nov. 5, 2019.
Rivard et al., U.S. Appl. No. 16/662,965, filed Oct. 24, 2019.
Office Action from Japanese Patent Application No. 2017-544281, dated Nov. 26, 2019.
Extended European Search Report from European Application No. 16915389.7, dated Dec. 2, 2019.
Office Action from Japanese Patent Application No. 2017-544284, dated Dec. 10, 2019.
Feder et al., U.S. Appl. No. 16/684,389, filed Nov. 14, 2019.
Non-Final Office Action for U.S. Appl. No. 16/505,278, dated Jan. 10, 2020.
Notice of Allowance from U.S. Appl. No. 16/519,244, dated Jan. 14, 2020.
Office Action from Japanese Patent Application No. 2017-544282, dated Jan. 7, 2020.
Corrected Notice of Allowance from U.S. Appl. No. 16/857,016, dated Feb. 16, 2021.
Feder et al., U.S. Appl. No. 17/171,800, filed Feb. 9, 2021.
Rivard et al., U.S. Appl. No. 17/163,086, filed Jan. 29, 2021.
Non-Final Office Action for U.S. Appl. No. 16/662,965, dated Mar. 22, 2021.
Decision to Refuse from European Application No. 15856710.7, dated Mar. 15, 2021.
Examination Report from Indian Application No. 201827049041, dated Mar. 19, 2021.
Decision to Refuse from European Application No. 15856212.4, dated Mar. 22, 2021.
Office Action from Chinese Patent Application No. 201780053926.9, dated Jan. 16, 2020.
Rivard et al., U.S. Appl. No. 16/796,497, filed Feb. 20, 2020.
Corrected Notice of Allowance from U.S. Appl. No. 16/519,244, dated Feb. 20, 2020.
Extended European Search Report from European Application No. 17821236.1, dated Jan. 24, 2020.
Petschnigg et al., "Digital Photography with Flash and No-Flash Image Pairs," ACM Transactions of Graphics, vol. 23, Aug. 2004, pp. 664-672.
Corrected Notice of Allowance from U.S. Appl. No. 16/519,244, dated Apr. 9, 2020.
Rivard et al., U.S. Appl. No. 16/857,016, filed Apr. 23, 2020.
International Preliminary Examination Report from PCT Application No. PCT/US2018/054014, dated Apr. 16, 2020.
Office Action from Chinese Patent Application No. 201680088945.0, dated May 21, 2020.
Notice of Allowance from U.S. Appl. No. 16/213,041, dated May 29, 2020.
Supplemental Notice of Allowance from U.S. Appl. No. 16/213,041, dated Jun. 17, 2020.
Non-Final Office Action for U.S. Appl. No. 16/857,016, dated Aug. 5, 2020.
Rivard, W. et al., U.S. Appl. No. 17/000,098, filed Aug. 21, 2020.
Office Action from Japanese Patent Application No. 2017-544284, dated Aug. 18, 2020.
International Search Report and Written Opinion from PCT Application No. PCT/US2020/040478, dated Sep. 25, 2020.
Notice of Allowance from U.S. Appl. No. 16/505,278, dated Sep. 25, 2020.

(56) References Cited

OTHER PUBLICATIONS

Supplemental Notice of Allowance from U.S. Appl. No. 16/213,041, dated Aug. 31, 2020.
Summons to Attend Oral Proceedings from European Application No. 15 856 710.7, dated Sep. 18, 2020.
Notice of Allowance from U.S. Appl. No. 16/584,486, dated Oct. 21, 2020.
Corrected Notice of Allowance from U.S. Appl. No. 16/505,278, dated Oct. 22, 2020.
Notice of Allowance from U.S. Appl. No. 16/684,389, dated Oct. 29, 2020.
Office Action from Japanese Patent Application No. 2017-544281, dated Oct. 27, 2020.
Office Action from Chinese Patent Application No. 201780053926.9, dated Oct. 13, 2020.
Corrected Notice of Allowance from U.S. Appl. No. 16/584,486, dated Nov. 18, 2020.
Corrected Notice of Allowance from U.S. Appl. No. 16/505,278, dated Nov. 18, 2020.
Corrected Notice of Allowance from U.S. Appl. No. 16/684,389, dated Nov. 27, 2020.
Office Action from Japanese Patent Application No. 2017-544280, dated Jun. 30, 2020.
Corrected Notice of Allowance from U.S. Appl. No. 16/505,278, dated Dec. 24, 2020.
Corrected Notice of Allowance from U.S. Appl. No. 16/584,486, dated Dec. 24, 2020.
Second Office Action from Chinese Patent Application No. 201680088945.0, dated Dec. 17, 2020.
Corrected Notice of Allowance from U.S. Appl. No. 16/684,389, dated Dec. 23, 2020.
Final Office Action for U.S. Appl. No. 16/662,965, dated Sep. 3, 2021.
Office Action from Chinese Patent Application No. 202010904659.5, dated Jul. 28, 2021.
Extended European Search Report from European Application No. 21175832.1, dated Aug. 27, 2021.
Examination Report from Indian Application No. 201927010939, dated Jun. 9, 2021.
Non-Final Office Action for U.S. Appl. No. 17/163,086, dated Oct. 13, 2021.
Non-Final Office Action for U.S. Appl. No. 17/000,098, dated Dec. 7, 2021.
Non-Final Office Action for U.S. Appl. No. 16/796,497, dated Dec. 8, 2021.
Extended European Search Report from European Application No. 21196442.4, dated Dec. 13, 2021.
Huo et al., "Robust Automatic White Balance algorithm using Gray Color Points in Images," IEEE Transactions on Consumer Electronics, vol. 52, No. 2, May 2006, pp. 541-546.

* cited by examiner

Figure 7A  Figure 7B

SYSTEMS AND METHODS FOR GENERATING A DIGITAL IMAGE

RELATED APPLICATIONS

The present application is a continuation of, and claims priority to, U.S. patent application Ser. No. 16/505,278, titled "SYSTEMS AND METHODS FOR GENERATING A DIGITAL IMAGE," filed Jul. 8, 2019, which in turn is a continuation of, and claims priority to, U.S. patent application Ser. No. 16/154,999, titled "SYSTEMS AND METHODS FOR GENERATING A DIGITAL IMAGE USING SEPARATE COLOR AND INTENSITY DATA," filed Oct. 9, 2018, now U.S. Pat. No. 10,375,369, which in turn is a continuation of, and claims priority to, U.S. patent application Ser. No. 15/885,296, titled "SYSTEMS AND METHODS FOR GENERATING A DIGITAL IMAGE," filed Jan. 31, 2018, now U.S. Pat. No. 10,129,514, which in turn is a continuation of, and claims priority to, U.S. patent application Ser. No. 15/352,510, titled "SYSTEMS AND METHODS FOR GENERATING A DIGITAL IMAGE," filed Nov. 15, 2016, now U.S. Pat. No. 9,912,928, which in turn claims priority to U.S. patent application Ser. No. 14/702,549, now U.S. Pat. No. 9,531,691, titled "SYSTEMS AND METHODS FOR GENERATING A DIGITAL IMAGE USING SEPARATE COLOR AND INTENSITY DATA," filed May 1, 2015. The foregoing applications and/or patents are herein incorporated by reference in their entirety for all purposes.

Additionally, this application is related to the following U.S. Patent Applications, the entire disclosures being incorporated by reference herein: application Ser. No. 13/573,252, now U.S. Pat. No. 8,976,264, titled "COLOR BALANCE IN DIGITAL PHOTOGRAPHY," filed Sep. 4, 2012; U.S. patent application Ser. No. 14/534,068, now U.S. Pat. No. 9,167,174, titled "SYSTEMS AND METHODS FOR HIGH-DYNAMIC RANGE IMAGES," filed Nov. 5, 2014; U.S. patent application Ser. No. 14/534,079, now U.S. Pat. No. 9,137,455, titled "IMAGE SENSOR APPARATUS AND METHOD FOR OBTAINING MULTIPLE EXPOSURES WITH ZERO INTERFRAME TIME," filed Nov. 5, 2014; U.S. patent application Ser. No. 14/534,089, now U.S. Pat. No. 9,167,169, titled "IMAGE SENSOR APPARATUS AND METHOD FOR SIMULTANEOUSLY CAPTURING MULTIPLE IMAGES," filed Nov. 5, 2014; U.S. patent application Ser. No. 14/535,274, now U.S. Pat. No. 9,154,708, titled "IMAGE SENSOR APPARATUS AND METHOD FOR SIMULTANEOUSLY CAPTURING FLASH AND AMBIENT ILLUMINATED IMAGES," filed Nov. 6, 2014; and U.S. patent application Ser. No. 14/535,279, now U.S. Pat. No. 9,179,085, titled "IMAGE SENSOR APPARATUS AND METHOD FOR OBTAINING LOW-NOISE, HIGH-SPEED CAPTURES OF A PHOTOGRAPHIC SCENE," filed Nov. 6, 2014.

FIELD OF THE INVENTION

The present invention relates generally to digital photographic systems, and more specifically to generating a digital image from separate color and intensity data.

BACKGROUND

The human eye reacts to light in different ways based on the response of rods and cones in the retina. Specifically, the perception of the response of the eye is different for different colors (e.g., red, green, and blue) in the visible spectrum as well as between luminance and chrominance. Conventional techniques for capturing digital images rely on a CMOS image sensor or CCD image sensor positioned under a color filter array such as a Bayer color filter. Each photodiode of the image sensor samples an analog value that represents an amount of light associated with a particular color at that pixel location. The information for three or more different color channels may then be combined (or filtered) to generate a digital image.

The resulting images generated by these techniques have a reduced spatial resolution due to the blending of values generated at different discrete locations of the image sensor into a single pixel value in the resulting image. Fine details in the scene could be represented poorly due to this filtering of the raw data.

Furthermore, based on human physiology, it is known that human vision is more sensitive to luminance information than chrominance information. In other words, the human eye can recognize smaller details due to changes in luminance when compared to changes in chrominance. However, conventional image capturing techniques do not typically exploit the differences in perception between chrominance and luminance information. Thus, there is a need to address these issues and/or other issues associated with the prior art.

SUMMARY

A system, method, and computer program product for generating a digital image is disclosed. In use, a first image and a second image are received from a first image sensor, where the first image sensor detects wavelengths of a visible spectrum. A third image and a fourth image are received from a second image sensor, where the second image sensor detects wavelengths of a non-visible spectrum. Using an image processing subsystem, a resulting image is generated by combining at least three of: the first image, the second image, the third image, or the fourth image.

BRIEF DESCRIPTION OF THE DRAWINGS

FIG. 7A illustrates a configuration of the camera module, in accordance with one embodiment;

FIG. 7B illustrates a configuration of the camera module, in accordance with another embodiment;

DETAILED DESCRIPTION

Embodiments of the present invention enable a digital photographic system to generate a digital image (or simply "image") of a photographic scene subjected to strobe illumination. Exemplary digital photographic systems include, without limitation, digital cameras and mobile devices such as smart phones that are configured to include a digital camera module and a strobe unit. A given photographic scene is a portion of an overall scene sampled by the digital photographic system.

The digital photographic system may capture separate image data for chrominance components (i.e., color) and luminance (i.e., intensity) components for a digital image. For example, a first image sensor may be used to capture chrominance data and a second image sensor may be used to capture luminance data. The second image sensor may be different than the first image sensor. For example, a resolution of the second image sensor may be higher than the first image sensor, thereby producing more detail related to the luminance information of the captured scene when compared to the chrominance information captured by the first image sensor. The chrominance information and the luminance information may then be combined to generate a resulting image that produces better images than captured with a single image sensor using conventional techniques.

In another embodiment, two or more images are sequentially sampled by the digital photographic system to generate an image set. Each image within the image set may be generated in conjunction with different strobe intensity, different exposure parameters, or a combination thereof. Exposure parameters may include sensor sensitivity ("ISO" parameter), exposure time (shutter speed), aperture size (f-stop), and focus distance. In certain embodiments, one or more exposure parameters, such as aperture size, may be constant and not subject to determination. For example, aperture size may be constant based on a given lens design associated with the digital photographic system. At least one of the images comprising the image set may be sampled in conjunction with a strobe unit, such as a light-emitting diode (LED) strobe unit, configured to contribute illumination to the photographic scene.

Separate image sets may be captured for chrominance information and luminance information. For example, a first image set may capture chrominance information under ambient illumination and strobe illumination at different strobe intensities and/or exposure parameters. A second image set may capture luminance information under the same settings. The chrominance information and luminance information may then be blended to produce a resulting image with greater dynamic range that could be captured using a single image sensor.

Figure 1:
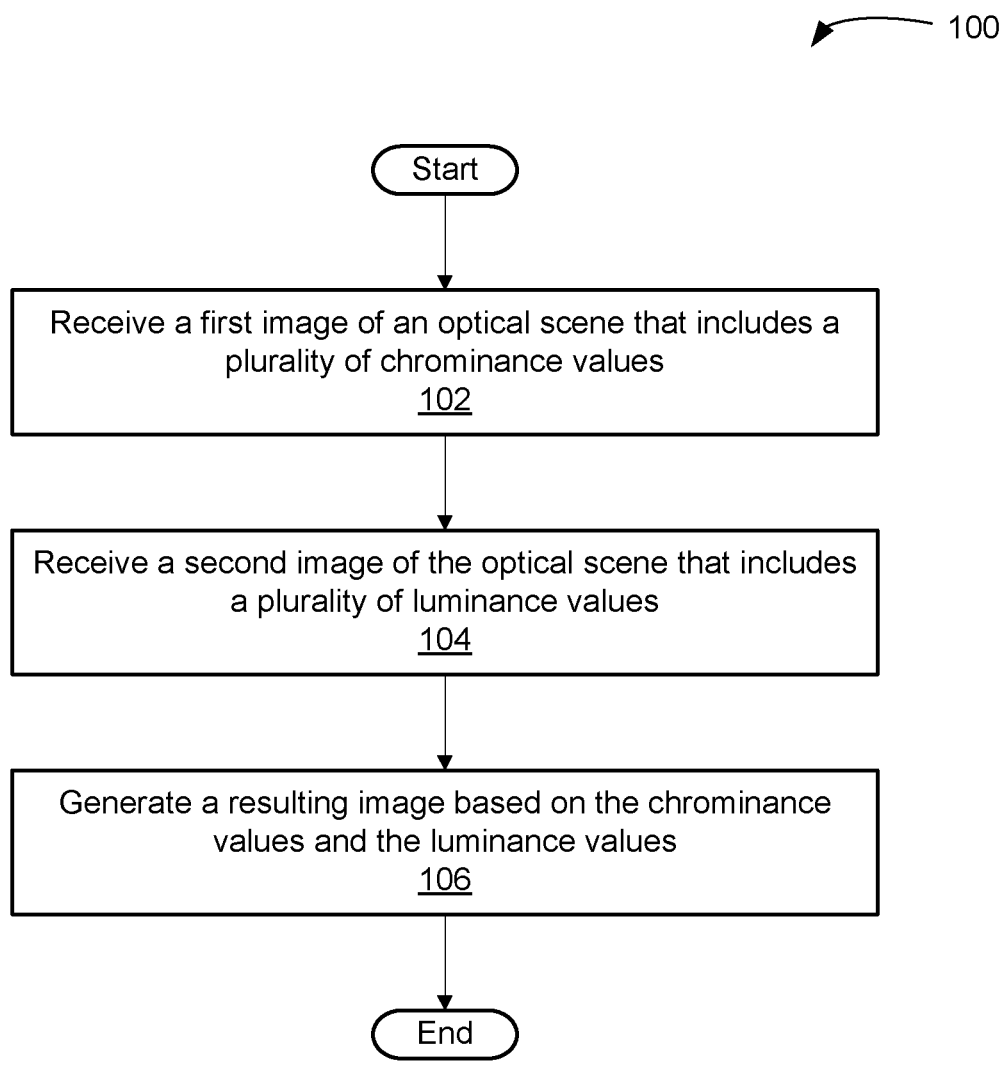
FIG. 1 illustrates a flow chart of a method 100 for generating a digital image, in accordance with one embodiment.

FIG. 1 illustrates a flow chart of a method 100 for generating a digital image, in accordance with one embodiment. Although method 100 is described in conjunction with the systems of FIGS. 2-7C, persons of ordinary skill in the art will understand that any system that performs method 100 is within the scope and spirit of embodiments of the present invention. In one embodiment, a digital photographic system, such as digital photographic system 300 of FIG. 3A, is configured to perform method 100. The digital photographic system 300 may be implemented within a digital camera, such as digital camera 302 of FIG. 3C, or a mobile device, such as mobile device 376 of FIG. 3D.

Method 100 begins at step 102, where a processor, such as processor complex 310, receives a first image of an optical scene that includes a plurality of chrominance values (referred to herein as a chrominance image). The chrominance image may be captured using a first image sensor, such as a CMOS image sensor or a CCD image sensor. In one embodiment, the chrominance image includes a plurality of pixels, where each pixel is associated with a different color channel component (e.g., red, green, blue, cyan, magenta, yellow, etc.). In another embodiment, each pixel is associated with a tuple of values, each value in the tuple associated with a different color channel component (i.e., each pixel includes a red value, a blue value, and a green value).

At step 104, the processor receives a second image of the optical scene that includes a plurality of luminance values (referred to herein as a luminance image). The luminance image may be captured using a second image sensor, which is different than the first image sensor. Alternatively, the luminance image may be captured using the first image sensor. For example, the chrominance values may be captured by a first subset of photodiodes of the first image sensor and the luminance values may be captured by a second subset of photodiodes of the first image sensor. In one embodiment, the luminance image includes a plurality of pixels, where each pixel is associated with an intensity component. The intensity component specifies a brightness of the image at that pixel. A bit depth of the intensity component may be equal to or different from a bit depth of each of the color channel components in the chrominance image. For example, each of the color channel components in the chrominance image may have a bit depth of 8 bits, but the intensity component may have a bit depth of 12 bits. The bit depths may be different where the first image sensor and the second image sensor sample analog values generated by the photodiodes in the image sensors using analog-to-digital converters (ADCs) having a different level of precision.

In one embodiment, each pixel in the chrominance image is associated with one or more corresponding pixels in the luminance image. For example, the chrominance image and the luminance image may have the same resolution and pixels in the chrominance image have a 1-to-1 mapping to corresponding pixels in the luminance image. Alternatively, the luminance image may have a higher resolution than the chrominance image, where each pixel in the chrominance image is mapped to two or more pixels in the luminance image. It will be appreciated that any manner of mapping the pixels in the chrominance image to the pixels in the luminance image is contemplated as being within the scope of the present invention.

At step 106, the processor generates a resulting image based on the first image and second image. In one embodiment, the resulting image has the same resolution as the second image (i.e., the luminance image). For each pixel in the resulting image, the processor blends the chrominance information and the luminance information to generate a resulting pixel value in the resulting image. In one embodiment, the processor determines one or more pixels in the chrominance image associated with the pixel in the resulting image. For example, the processor may select a corresponding pixel in the chrominance image that includes a red value, a green value, and a blue value that specifies a color in an RGB color space. The processor may convert the color specified in the RGB color space to a Hue-Saturation-Value (HSV) color value. In the HSV model, Hue represents a particular color, Saturation represents a "depth" of the color (i.e., whether the color is bright and bold or dim and grayish), and the Value represents a lightness of the color (i.e., whether the color intensity is closer to black or white). The processor may also determine one or more pixels in the luminance image associated with the pixel in the resulting image. A luminance value may be determined from the one or more pixels in the luminance image. The luminance value may be combined with the Hue value and Saturation value determined from the chrominance image to produce a new color specified in the HSV model. The new color may be different from the color specified by the chrominance information alone because the luminance value may be captured more accurately with respect to spatial resolution or precision (i.e., bit depth, etc.). In one embodiment, the new color specified in the HSV model may be converted back into the RGB color space and stored in the resulting image. Alternatively, the color may be converted into any technically feasible color space representation, such as YCrCb, R'G'B', or other types of color spaces well-known in the art.

In one embodiment, the processor may apply a filter to a portion of the chrominance image to select a number of color channel component values from the chrominance image. For example, a single RGB value may be determined based on a filter applied to a plurality of individual pixel values in the chrominance image, where each pixel specifies a value for a single color channel component.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

In one embodiment, the first image may comprise a chrominance image generated by combining two or more chrominance images, as described in greater detail below. Furthermore, the second image may comprise a luminance image generated by combining two or more luminance images, as described in greater detail below.

Figure 2:
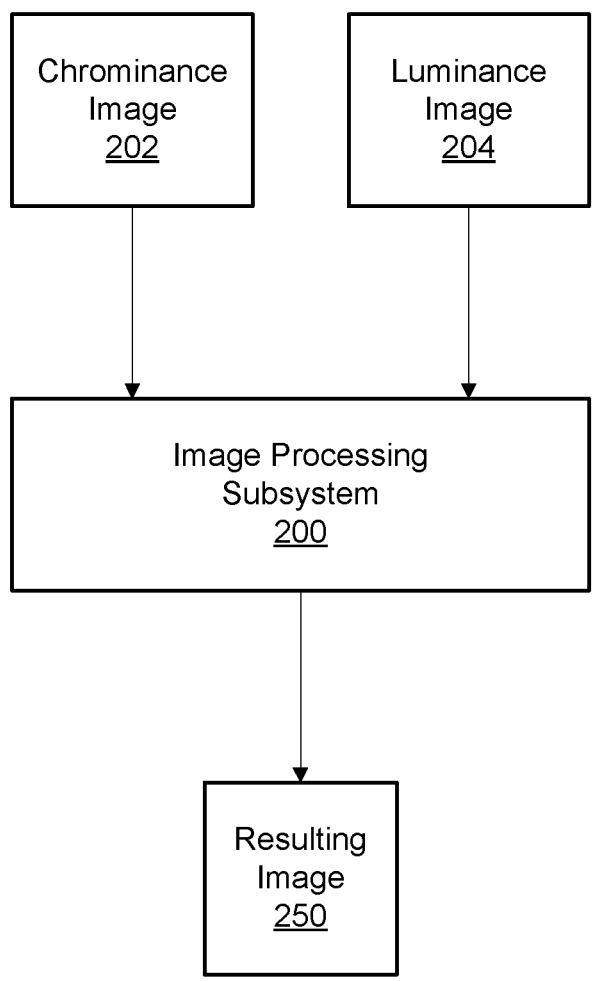
FIG. 2 illustrates an image processing subsystem configured to implement the method 100 of FIG. 1, in accordance with one embodiment.
Figure 3A:
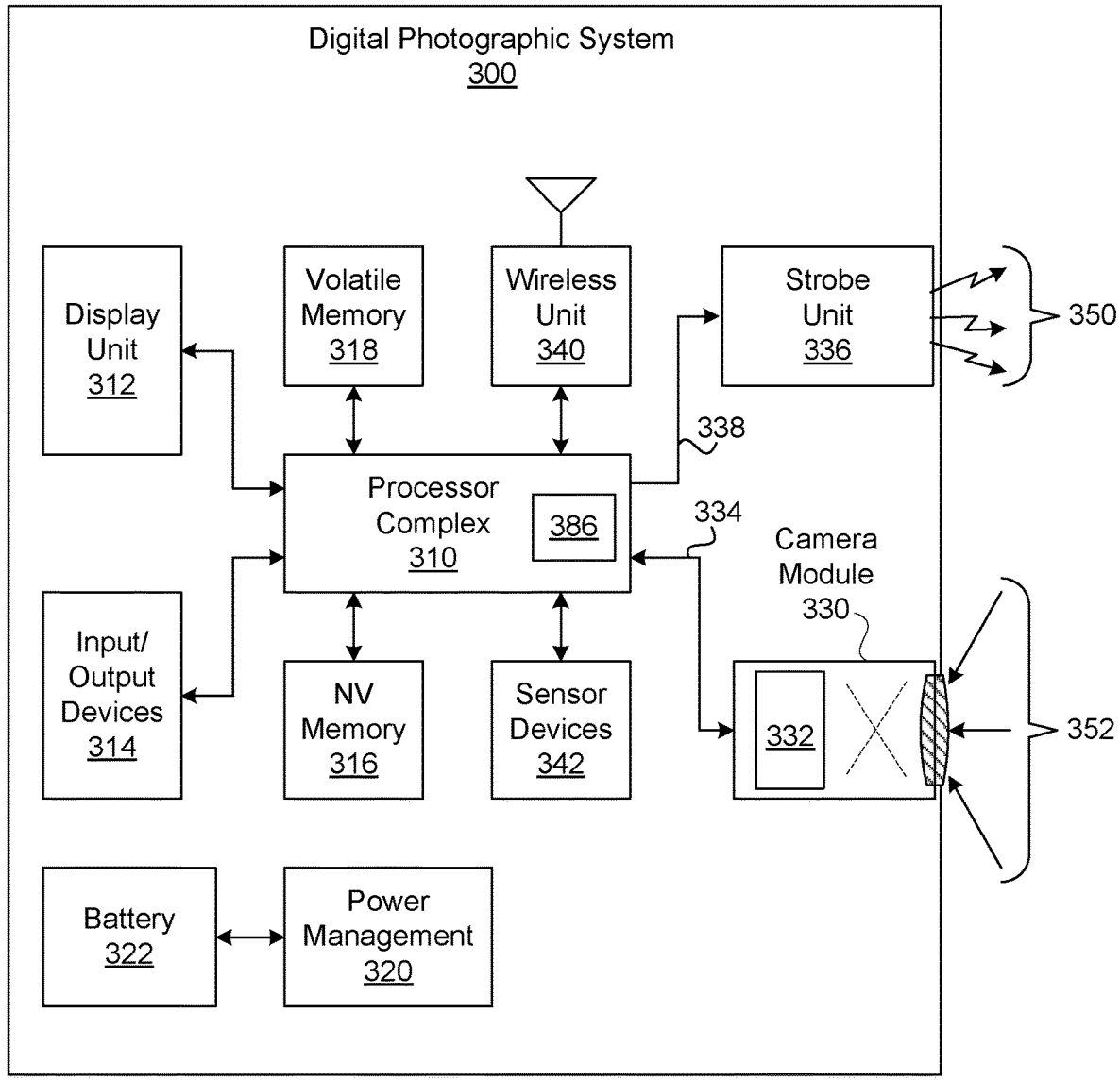
FIG. 3A illustrates a digital photographic system, configured to implement one or more aspects of the present invention.

FIG. 2 illustrates an image processing subsystem 200 configured to implement the method 100 of FIG. 1, in accordance with one embodiment. In one embodiment, the image processing subsystem 200 includes a software module, executed by a processor, which causes the processor to generate the resulting image 250 from the chrominance image 202 and the luminance image 204. The processor may be a highly parallel processor such as a graphics processing unit (GPU). In one embodiment, the software module may be a shader program, such as a pixel shader or fragment shader, which is executed by the GPU once per pixel in the resulting image 250. Each of the chrominance image 202 and the luminance image 204 may be stored as texture maps in a memory and accessed by the shader program using, e.g., a texture cache of the GPU.

In one embodiment, each instance of the shader program is executed for a corresponding pixel of the resulting image 250. Each pixel in the resulting image 250 is associated with a set of coordinates that specifies a location of the pixel in the resulting image 250. The coordinates may be used to access values in the chrominance image 202 as well as values in the luminance image 204. The values may be evaluated by one or more functions to generate a value(s) for the pixel in the resulting image 250. In one embodiment, at least two instances of the shader program associated with different pixels in the resulting image 250 may be executed in parallel.

In another embodiment, the image processing subsystem 200 may be a special function unit such as a logic circuit within an application-specific integrated circuit (ASIC). The ASIC may include the logic circuit for generating the resulting image 250 from a chrominance image 202 and a luminance image 204. In one embodiment, the chrominance image 202 is captured by a first image sensor at a first resolution and values for pixels in the chrominance image 202 are stored in a first format. Similarly, the luminance image 204 is captured by a second image sensor at a second resolution, which may be the same as or different from the first resolution, and values for pixels in the luminance image 204 are stored in a second format. The logic may be designed specifically for the chrominance image 202 at the first resolution and first format and the luminance image 204 at the second resolution and second format.

In yet another embodiment, the image processing subsystem 200 is a general purpose processor designed to process the chrominance image 202 and the luminance image 204 according to a specific algorithm. The chrominance image 202 and the luminance image 204 may be received from an external source. For example, the image processing subsystem 200 may be a service supplied by a server computer over a network. A source (i.e., a client device connected to the network) may send a request to the service to process a pair of images, including a chrominance image 202 and a luminance image 204. The source may transmit the chrominance image 202 and luminance image 204 to the service via the network. The image processing subsystem 200 may be configured to receive a plurality of pairs of images from one or more sources (e.g., devices connected to the network) and process each pair of images to generate a corresponding plurality of resulting images 250. Each resulting image 250 may be transmitted to the requesting source via the network.

As described above, a chrominance image and a luminance image may be combined to generate a resulting image that has better qualities than could be achieved with conventional techniques. For example, a typical image sensor may generate only chrominance data, which results in a perceived luminance from the combination of all color channel components. However, each individual color channel component may be sampled from a different discrete location and then combined to generate a digital image where each spatial location (i.e., pixel) is a combination of all color channel components. In other words, the digital image is a blurred version of the raw optical information captured by the image sensor. By utilizing luminance information that has not been filtered and then adding color component information to each pixel, a more precise digital image may be reproduced. Furthermore, splitting the capture of the chrominance information from the luminance information allows each component of the image to be captured separately, potentially with different image sensors tailored to each application. Such advantages will be discussed in more detail below.

FIG. 3A illustrates a digital photographic system 300, configured to implement one or more aspects of the present invention. Digital photographic system 300 includes a processor complex 310 coupled to a camera module 330 and a strobe unit 336. Digital photographic system 300 may also include, without limitation, a display unit 312, a set of input/output devices 314, non-volatile memory 316, volatile memory 318, a wireless unit 340, and sensor devices 342, each coupled to processor complex 310. In one embodiment, a power management subsystem 320 is configured to generate appropriate power supply voltages for each electrical load element within digital photographic system 300. A battery 322 may be configured to supply electrical energy to power management subsystem 320. Battery 322 may implement any technically feasible energy storage system, including primary or rechargeable battery technologies.

In one embodiment, strobe unit 336 is integrated into digital photographic system 300 and configured to provide strobe illumination 350 during an image sample event performed by digital photographic system 300. In an alternative embodiment, strobe unit 336 is implemented as an independent device from digital photographic system 300 and configured to provide strobe illumination 350 during an image sample event performed by digital photographic system 300. Strobe unit 336 may comprise one or more LED devices. In certain embodiments, two or more strobe units are configured to synchronously generate strobe illumination in conjunction with sampling an image.

In one embodiment, strobe unit 336 is directed through a strobe control signal 338 to either emit strobe illumination 350 or not emit strobe illumination 350. The strobe control signal 338 may implement any technically feasible signal transmission protocol. Strobe control signal 338 may indicate a strobe parameter, such as strobe intensity or strobe color, for directing strobe unit 336 to generate a specified intensity and/or color of strobe illumination 350. As shown, strobe control signal 338 may be generated by processor complex 310. Alternatively, strobe control signal 338 may be generated by camera module 330 or by any other technically feasible system element.

In one usage scenario, strobe illumination 350 comprises at least a portion of overall illumination in a photographic scene being photographed by camera module 330. Optical scene information 352, which may include strobe illumination 350 reflected from objects in the photographic scene, is focused as an optical image onto an image sensor 332, within camera module 330. Image sensor 332 generates an electronic representation of the optical image. The electronic representation comprises spatial color intensity information, which may include different color intensity samples, such as for red, green, and blue light. The spatial color intensity information may also include samples for white light. Alternatively, the color intensity samples may include spatial color intensity information for cyan, magenta, and yellow light. Persons skilled in the art will recognize that other and further sets of spatial color intensity information may be implemented. The electronic representation is transmitted to processor complex 310 via interconnect 334, which may implement any technically feasible signal transmission protocol.

Input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, input/output devices 314 include a capacitive touch input surface coupled to display unit 312.

Non-volatile (NV) memory 316 is configured to store data when power is interrupted. In one embodiment, NV memory 316 comprises one or more flash memory devices. NV memory 316 may be configured to include programming instructions for execution by one or more processing units within processor complex 310. The programming instructions may implement, without limitation, an operating system (OS), UI modules, image processing and storage modules, one or more modules for sampling an image set through camera module 330, one or more modules for presenting the image set through display unit 312. The programming instructions may also implement one or more modules for merging images or portions of images within the image set, aligning at least portions of each image within the image set, or a combination thereof. One or more memory devices comprising NV memory 316 may be packaged as a module configured to be installed or removed by a user. In one embodiment, volatile memory 318 comprises dynamic random access memory (DRAM) configured to temporarily store programming instructions, image data such as data associated with an image set, and the like, accessed during the course of normal operation of digital photographic system 300.

Sensor devices 342 may include, without limitation, an accelerometer to detect motion and/or orientation, an electronic gyroscope to detect motion and/or orientation, a magnetic flux detector to detect orientation, a global positioning system (GPS) module to detect geographic position, or any combination thereof.

Wireless unit 340 may include one or more digital radios configured to send and receive digital data. In particular, wireless unit 340 may implement wireless standards known in the art as "WiFi" based on Institute for Electrical and Electronics Engineers (IEEE) standard 802.11, and may implement digital cellular telephony standards for data communication such as the well-known "3G" and "4G" suites of standards. Wireless unit 340 may further implement standards and protocols known in the art as LTE (long term evolution). In one embodiment, digital photographic system 300 is configured to transmit one or more digital photographs, sampled according to techniques taught herein, to an online or "cloud-based" photographic media service via wireless unit 340. The one or more digital photographs may reside within either NV memory 316 or volatile memory 318. In such a scenario, a user may possess credentials to access the online photographic media service and to transmit the one or more digital photographs for storage and presentation by the online photographic media service. The credentials may be stored or generated within digital photographic system 300 prior to transmission of the digital photographs. The online photographic media service may comprise a social networking service, photograph sharing service, or any other network-based service that provides storage and transmission of digital photographs. In certain embodiments, one or more digital photographs are generated by the online photographic media service based on an image set sampled according to techniques taught herein. In such embodiments, a user may upload source images comprising an image set for processing by the online photographic media service.

In one embodiment, digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (greater than forty-five degrees of sweep among cameras) to generate a panoramic photograph. The plurality of camera modules 330 may also be configured to sample two or more narrow angle views (less than forty-five degrees of sweep among cameras) to generate a stereoscopic photograph. The plurality of camera modules 330 may include at least one camera module configured to sample chrominance information and at least one different camera module configured to sample luminance information.

Display unit 312 is configured to display a two-dimensional array of pixels to form an image for display. Display unit 312 may comprise a liquid-crystal display, an organic LED display, or any other technically feasible type of display. In certain embodiments, display unit 312 is able to display a narrower dynamic range of image intensity values than a complete range of intensity values sampled over a set of two or more images comprising the image set. Here, images comprising the image set may be merged according to any technically feasible high dynamic range (HDR) blending technique to generate a synthetic image for display within dynamic range constraints of display unit 312. In one embodiment, the limited dynamic range specifies an eight-bit per color channel binary representation of corresponding color intensities. In other embodiments, the limited dynamic range specifies a twelve-bit per color channel binary representation.

Figure 3B:
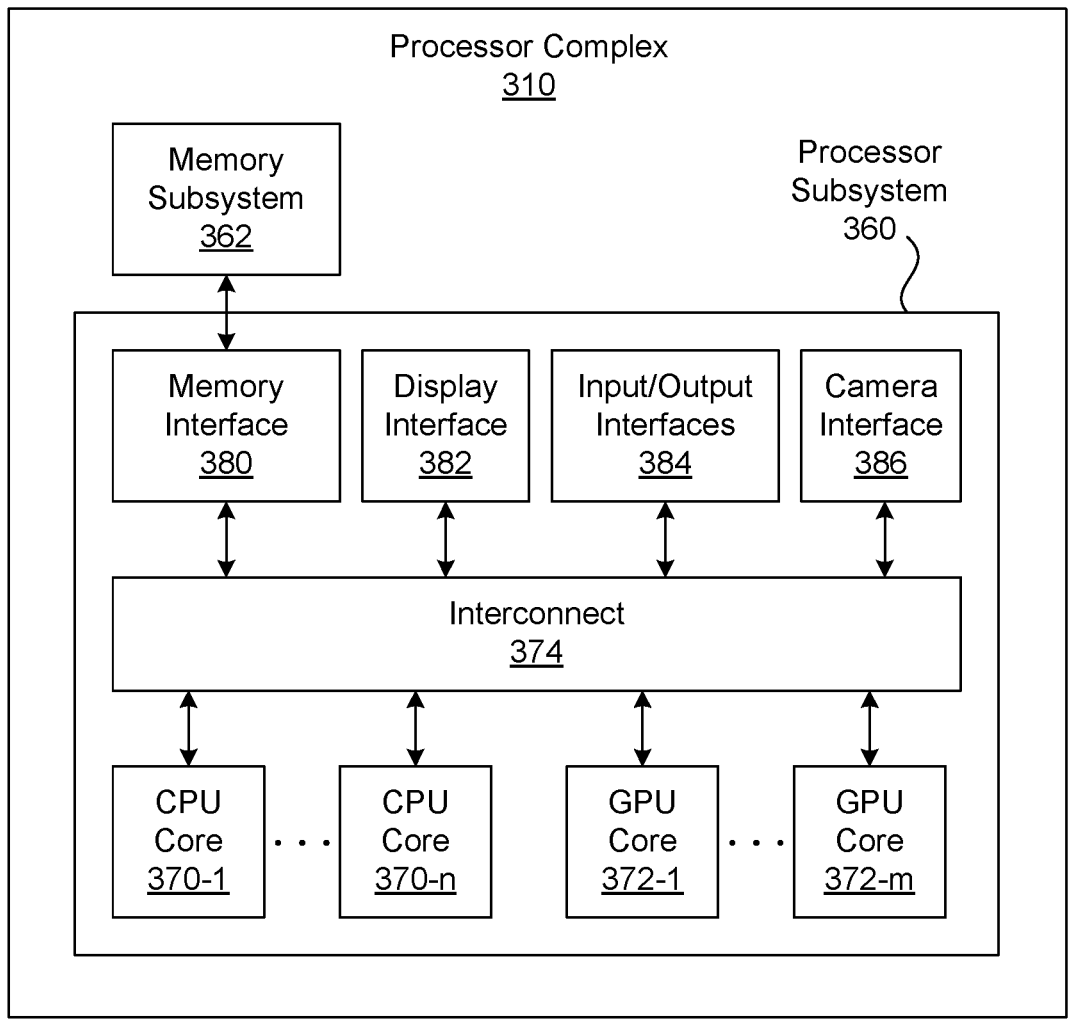
FIG. 3B illustrates a processor complex within digital photographic system of FIG. 3A, according to one embodiment of the present invention.

FIG. 3B illustrates a processor complex 310 within digital photographic system 300 of FIG. 3A, according to one embodiment of the present invention. Processor complex 310 includes a processor subsystem 360 and may include a memory subsystem 362. In one embodiment, processor complex 310 comprises a system on a chip (SoC) device that implements processor subsystem 360, and memory subsystem 362 comprising one or more DRAM devices coupled to processor subsystem 360. In one implementation of the embodiment, processor complex 310 comprises a multi-chip module (MCM) encapsulating the SoC device and the one or more DRAM devices.

Processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within memory subsystem 362, volatile memory 318, NV memory 316, or any combination thereof. Each of the one or more CPU cores 370 may be configured to retrieve and store data via interconnect 374 and memory interface 380. Each of the one or more CPU cores 370 may include a data cache, and an instruction cache. Two or more CPU cores 370 may share a data cache, an instruction cache, or any combination thereof. In one embodiment, a cache hierarchy is implemented to provide each CPU core 370 with a private cache layer, and a shared cache layer.

Processor subsystem 360 may further include one or more graphics processing unit (GPU) cores 372. Each GPU core 372 comprises a plurality of multi-threaded execution units that may be programmed to implement graphics acceleration functions. GPU cores 372 may be configured to execute multiple thread programs according to well-known standards such as OpenGL™, OpenCL™, CUDA™, and the like. In certain embodiments, at least one GPU core 372 implements at least a portion of a motion estimation function, such as a well-known Harris detector or a well-known Hessian-Laplace detector. Such a motion estimation function may be used for aligning images or portions of images within the image set.

Interconnect 374 is configured to transmit data between and among memory interface 380, display interface unit 382, input/output interfaces unit 384, CPU cores 370, and GPU cores 372. Interconnect 374 may implement one or more buses, one or more rings, a cross-bar, a mesh, or any other technically feasible data transmission structure or technique. Memory interface 380 is configured to couple memory subsystem 362 to interconnect 374. Memory interface 380 may also couple NV memory 316, volatile memory 318, or any combination thereof to interconnect 374. Display interface unit 382 is configured to couple display unit 312 to interconnect 374. Display interface unit 382 may implement certain frame buffer functions such as frame refresh. Alternatively, display unit 312 may implement frame refresh. Input/output interfaces unit 384 is configured to couple various input/output devices to interconnect 374.

In certain embodiments, camera module 330 is configured to store exposure parameters for sampling each image in an image set. When directed to sample an image set, the camera module 330 samples the image set according to the stored exposure parameters. A software module executing within processor complex 310 may generate and store the exposure parameters prior to directing the camera module 330 to sample the image set.

In other embodiments, camera module 330 is configured to store exposure parameters for sampling an image in an image set, and the camera interface unit 386 within the processor complex 310 is configured to cause the camera module 330 to first store exposure parameters for a given image comprising the image set, and to subsequently sample the image. In one embodiment, exposure parameters associated with images comprising the image set are stored within a parameter data structure. The camera interface unit 386 is configured to read exposure parameters from the parameter data structure for a given image to be sampled, and to transmit the exposure parameters to the camera module 330 in preparation of sampling an image. After the camera module 330 is configured according to the exposure parameters, the camera interface unit 386 directs the camera module 330 to sample an image. Each image within an image set may be sampled in this way. The data structure may be stored within the camera interface unit 386, within a memory circuit within processor complex 310, within volatile memory 318, within NV memory 316, or within any other technically feasible memory circuit. A software module executing within processor complex 310 may generate and store the data structure.

In one embodiment, the camera interface unit 386 transmits exposure parameters and commands to camera module 330 through interconnect 334. In certain embodiments, the camera interface unit 386 is configured to directly control the strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. That is, the camera interface unit 386 may synchronize the steps of configuring the camera module 330 prior to sampling an image, configuring the strobe unit 336 to generate appropriate strobe illumination, and directing the camera module 330 to sample a photographic scene subjected to strobe illumination.

Additional set-up time or execution time associated with each step may reduce overall sampling performance. Therefore, a dedicated control circuit, such as the camera interface unit 386, may be implemented to substantially minimize set-up and execution time associated with each step and any intervening time between steps.

In other embodiments, a software module executing within processor complex 310 directs the operation and synchronization of camera module 330 and the strobe unit 336, with potentially reduced performance.

In one embodiment, camera interface unit 386 is configured to accumulate statistics while receiving image data from the camera module 330. In particular, the camera interface unit 386 may accumulate exposure statistics for a given image while receiving image data for the image through interconnect 334. Exposure statistics may include an intensity histogram, a count of over-exposed pixels or under-exposed pixels, an intensity-weighted sum of pixel intensity, or any combination thereof. The camera interface unit 386 may present the exposure statistics as memory-mapped storage locations within a physical or virtual address space defined by a processor, such as a CPU core 370, within processor complex 310.

In certain embodiments, camera interface unit 386 accumulates color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image. In one embodiment, camera interface unit 386 accumulates spatial color statistics for performing color-matching between or among images, such as between or among one or more ambient images and one or more images sampled with strobe illumination. As with the exposure statistics, the color statistics may be presented as memory-mapped storage locations within processor complex 310.

In one embodiment, camera module 330 transmits strobe control signal 338 to strobe unit 336, enabling strobe unit 336 to generate illumination while the camera module 330 is sampling an image. In another embodiment, camera module 330 samples an image illuminated by strobe unit 336 upon receiving an indication from camera interface unit 386 that strobe unit 336 is enabled. In yet another embodiment, camera module 330 samples an image illuminated by strobe unit 336 upon detecting strobe illumination within a photographic scene via a rapid rise in scene illumination.

Figure 3C:
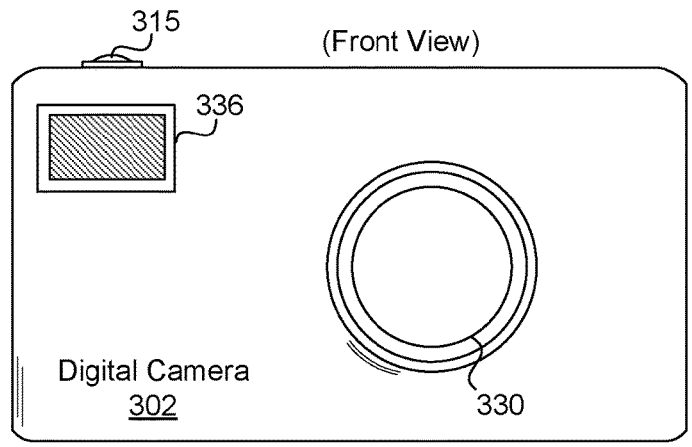
FIG. 3C illustrates a digital camera, in accordance with one embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
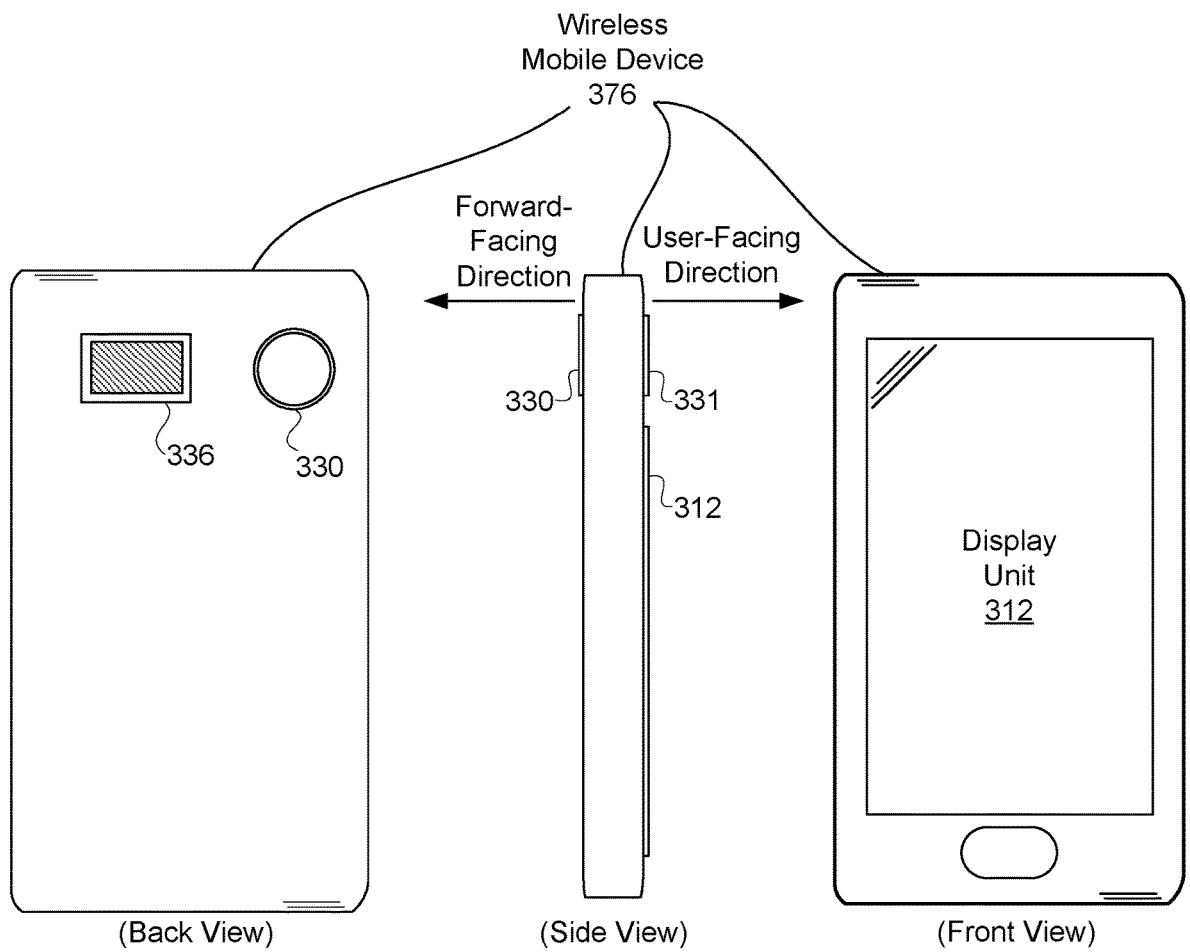
FIG. 3D illustrates a wireless mobile device, in accordance with one embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof. In one embodiment, the image stack may include one or more different images sampled for chrominance, and one or more different images sampled for luminance.

Figure 3E:
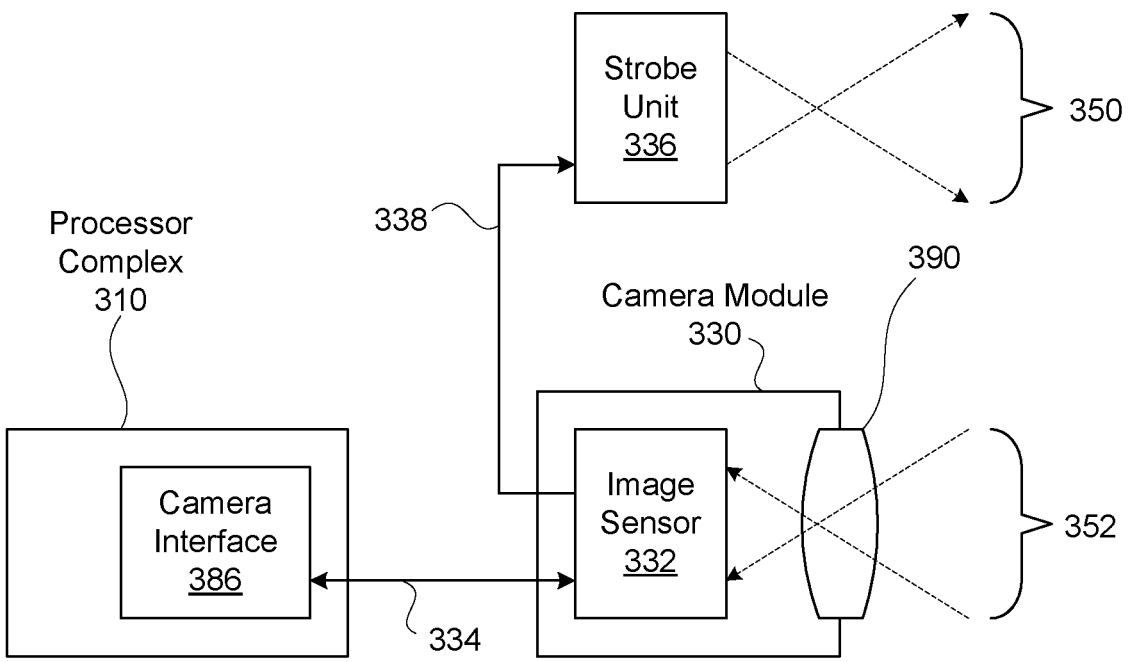
FIG. 3E illustrates camera module, in accordance with one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
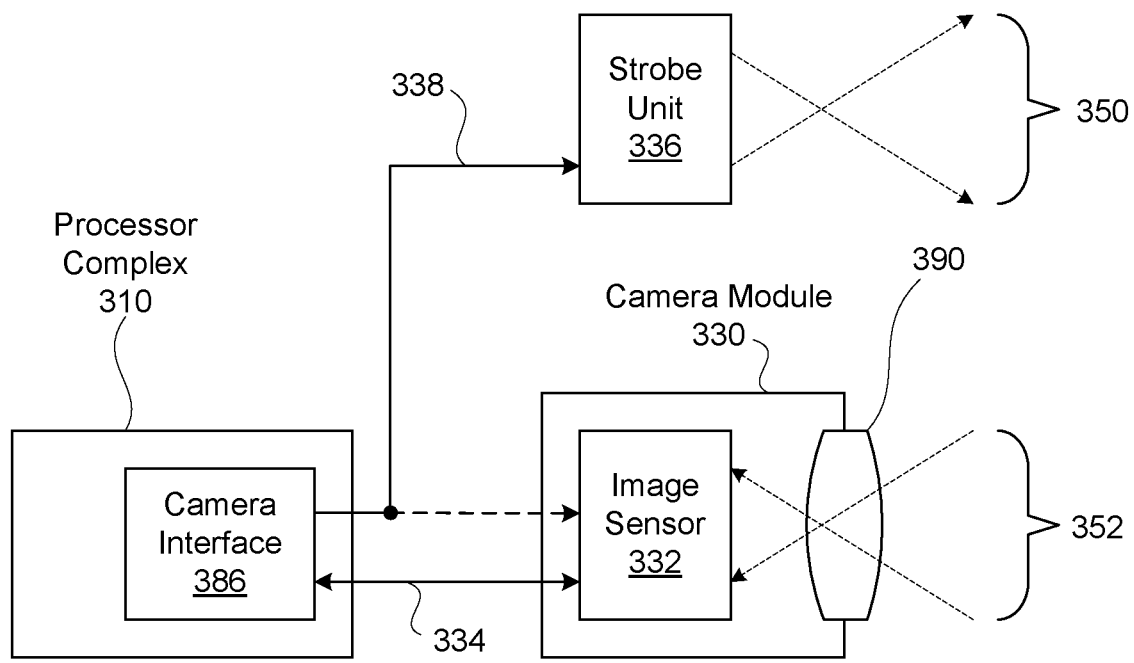
FIG. 3F illustrates a camera module, in accordance with one embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled.

For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B. The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
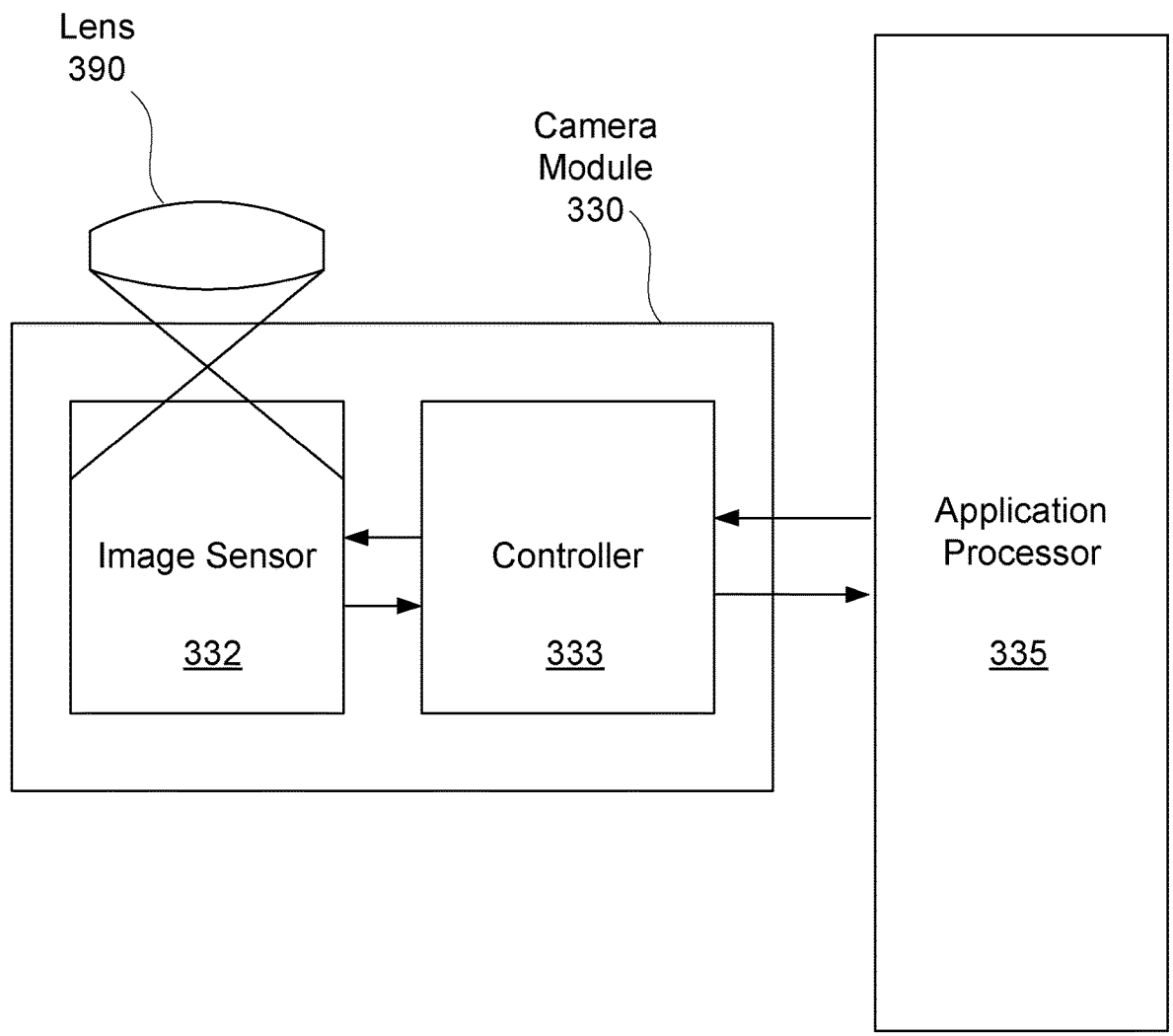
FIG. 3G illustrates camera module, in accordance with one embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
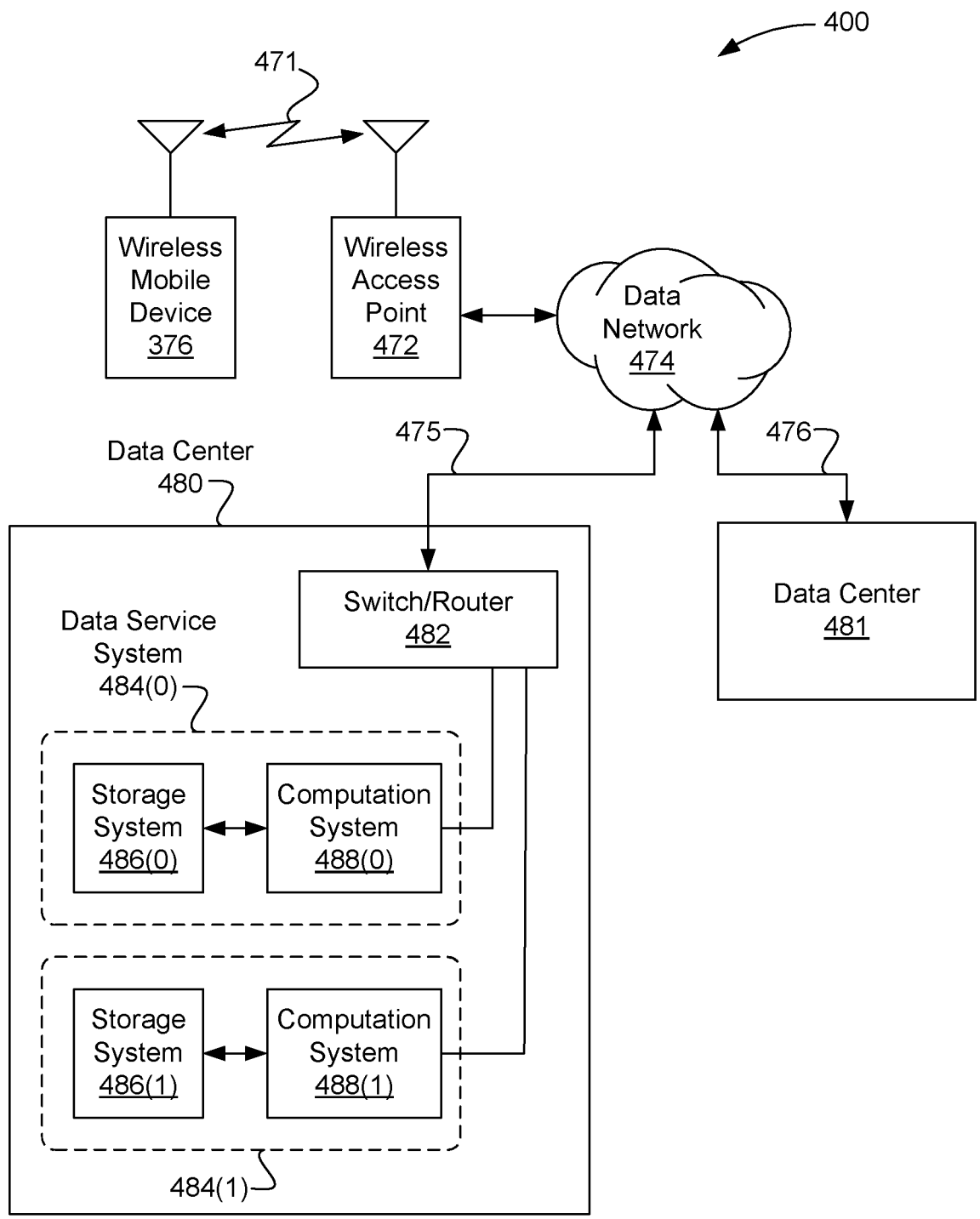
FIG. 4 illustrates a network service system, in accordance with one embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5A:
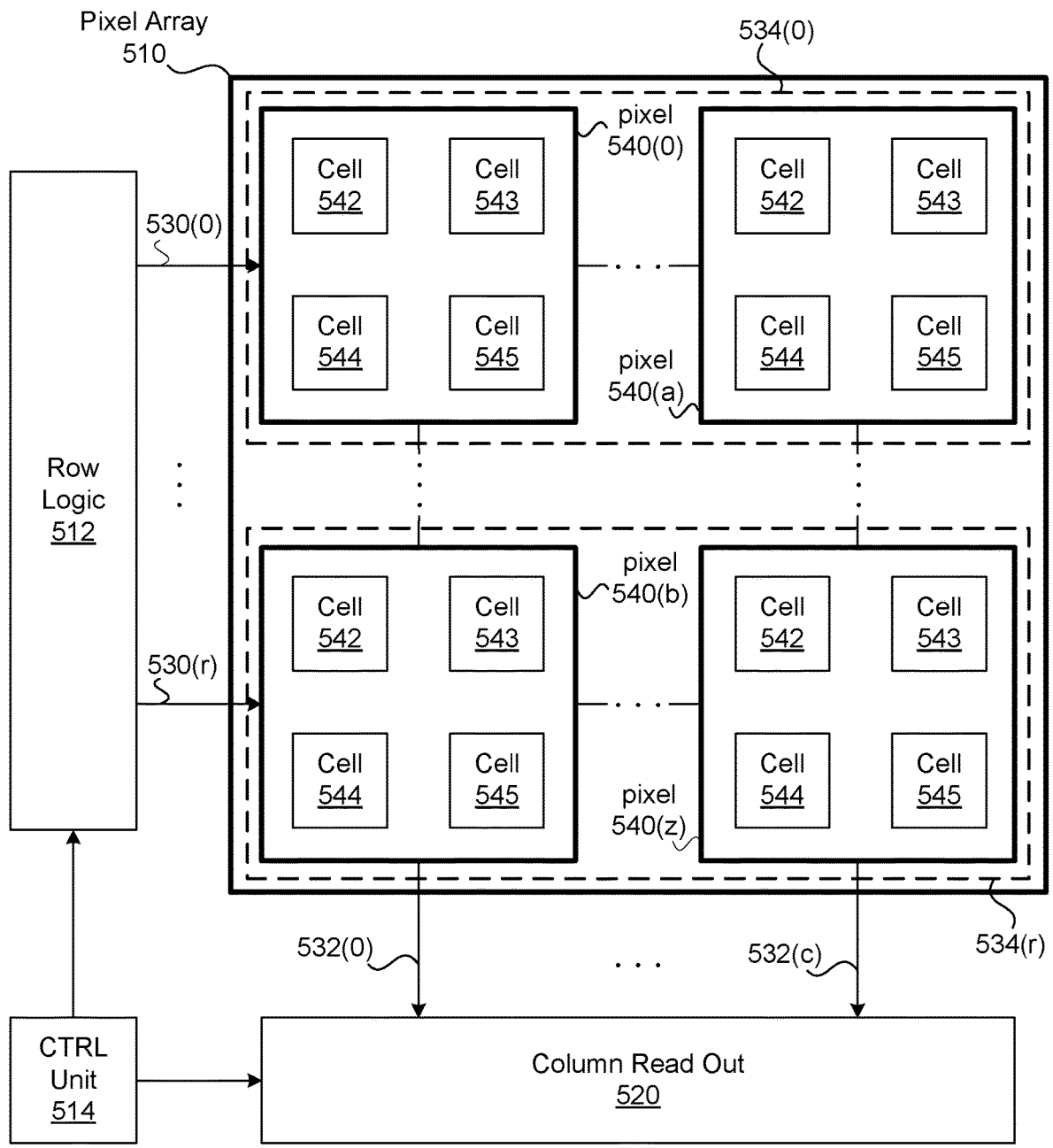
FIG. 5A illustrates a system for capturing optical scene information for conversion to an electronic representation of a photographic scene, in accordance with one embodiment.

FIG. 5A illustrates a system for capturing optical scene information for conversion to an electronic representation of a photographic scene, in accordance with one embodiment. As an option, the system of FIG. 5A may be implemented in the context of the details of any of the Figures. Of course, however, the system of FIG. 5A may be implemented in any desired environment. Further, the aforementioned definitions may equally apply to the description below.

As shown in FIG. 5A, a pixel array 510 is in communication with row logic 512 and a column read out circuit 520. Further, the row logic 512 and the column read out circuit 520 are both in communication with a control unit 514. Still further, the pixel array 510 is shown to include a plurality of pixels 540, where each pixel 540 may include four cells, cells 542-545. In the context of the present description, the pixel array 510 may be included in an image sensor, such as image sensor 132 or image sensor 332 of camera module 330.

As shown, the pixel array 510 includes a 2-dimensional array of the pixels 540. For example, in one embodiment, the pixel array 510 may be built to comprise 4,000 pixels 540 in a first dimension, and 3,000 pixels 540 in a second dimension, for a total of 12,000,000 pixels 540 in the pixel array 510, which may be referred to as a 12 megapixel pixel array. Further, as noted above, each pixel 540 is shown to include four cells 542-545. In one embodiment, cell 542 may be associated with (e.g. selectively sensitive to, etc.) a first color of light, cell 543 may be associated with a second color of light, cell 544 may be associated with a third color of light, and cell 545 may be associated with a fourth color of light. In one embodiment, each of the first color of light, second color of light, third color of light, and fourth color of light are different colors of light, such that each of the cells 542-545 may be associated with different colors of light. In another embodiment, at least two cells of the cells 542-545 may be associated with a same color of light. For example, the cell 543 and the cell 544 may be associated with the same color of light.

Further, each of the cells 542-545 may be capable of storing an analog value. In one embodiment, each of the cells 542-545 may be associated with a capacitor for storing a charge that corresponds to an accumulated exposure during an exposure time. In such an embodiment, asserting a row select signal to circuitry of a given cell may cause the cell to perform a read operation, which may include, without limitation, generating and transmitting a current that is a function of the stored charge of the capacitor associated with the cell. In one embodiment, prior to a readout operation, current received at the capacitor from an associated photodiode may cause the capacitor, which has been previously charged, to discharge at a rate that is proportional to an incident light intensity detected at the photodiode. The remaining charge of the capacitor of the cell may then be read using the row select signal, where the current transmitted from the cell is an analog value that reflects the remaining charge on the capacitor. To this end, an analog value received from a cell during a readout operation may reflect an accumulated intensity of light detected at a photodiode. The charge stored on a given capacitor, as well as any corresponding representations of the charge, such as the transmitted current, may be referred to herein as analog pixel data. Of course, analog pixel data may include a set of spatially discrete intensity samples, each represented by continuous analog values.

Still further, the row logic 512 and the column read out circuit 520 may work in concert under the control of the control unit 514 to read a plurality of cells 542-545 of a plurality of pixels 540. For example, the control unit 514 may cause the row logic 512 to assert a row select signal comprising row control signals 530 associated with a given row of pixels 540 to enable analog pixel data associated with the row of pixels to be read. As shown in FIG. 5A, this may include the row logic 512 asserting one or more row select signals comprising row control signals 530(0) associated with a row 534(0) that includes pixel 540(0) and pixel 540(a). In response to the row select signal being asserted, each pixel 540 on row 534(0) transmits at least one analog value based on charges stored within the cells 542-545 of the pixel 540. In certain embodiments, cell 542 and cell 543 are configured to transmit corresponding analog values in response to a first row select signal, while cell 544 and cell 545 are configured to transmit corresponding analog values in response to a second row select signal.

In one embodiment, analog values for a complete row of pixels 540 comprising each row 534(0) through 534(r) may be transmitted in sequence to column read out circuit 520 through column signals 532. In one embodiment, analog values for a complete row or pixels or cells within a complete row of pixels may be transmitted simultaneously. For example, in response to row select signals comprising row control signals 530(0) being asserted, the pixel 540(0) may respond by transmitting at least one analog value from the cells 542-545 of the pixel 540(0) to the column read out circuit 520 through one or more signal paths comprising column signals 532(0); and simultaneously, the pixel 540(a) will also transmit at least one analog value from the cells 542-545 of the pixel 540(a) to the column read out circuit 520 through one or more signal paths comprising column signals 532(c). Of course, one or more analog values may be received at the column read out circuit 520 from one or more other pixels 540 concurrently with receiving the at least one analog value from the pixel 540(0) and concurrently with receiving the at least one analog value from the pixel 540(a). Together, a set of analog values received from the pixels 540 comprising row 534(0) may be referred to as an analog signal, and this analog signal may be based on an optical image focused on the pixel array 510.

Further, after reading the pixels 540 comprising row 534(0), the row logic 512 may select a second row of pixels 540 to be read. For example, the row logic 512 may assert one or more row select signals comprising row control signals 530(r) associated with a row of pixels 540 that includes pixel 540(b) and pixel 540(z). As a result, the column read out circuit 520 may receive a corresponding set of analog values associated with pixels 540 comprising row 534(r).

Figure 6A:
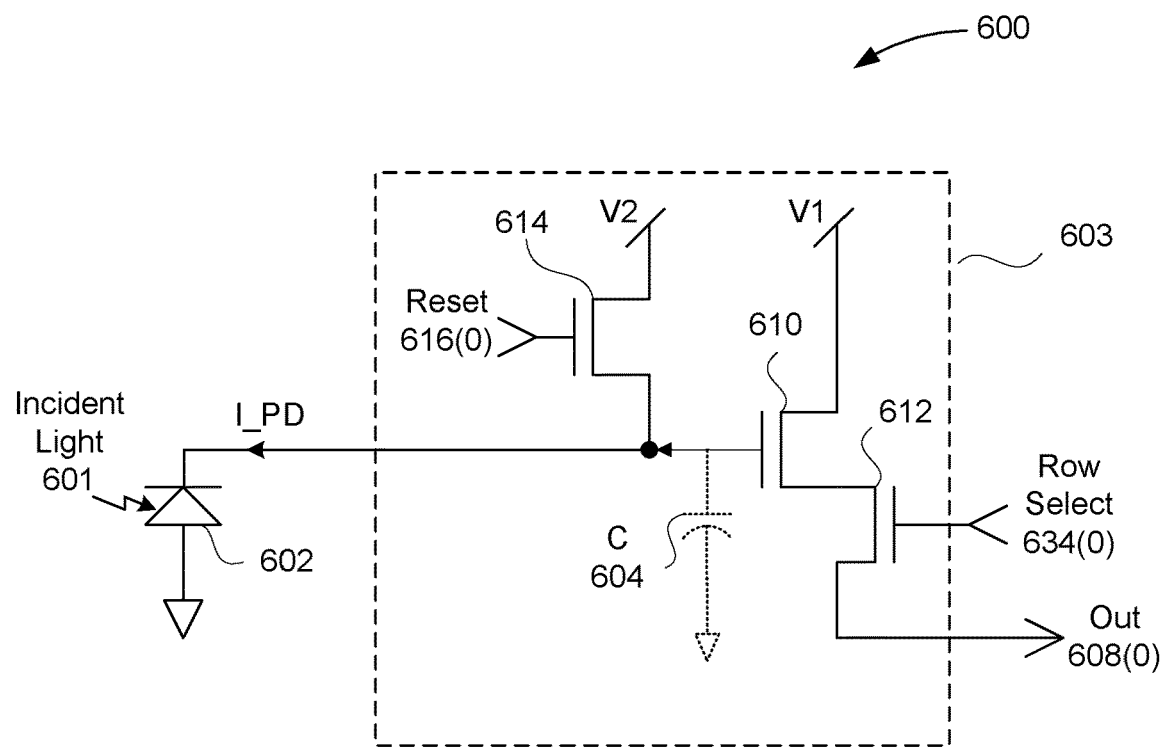
FIG. 6A illustrates a circuit diagram for a photosensitive cell, in accordance with one possible embodiment.
Figure 6B:
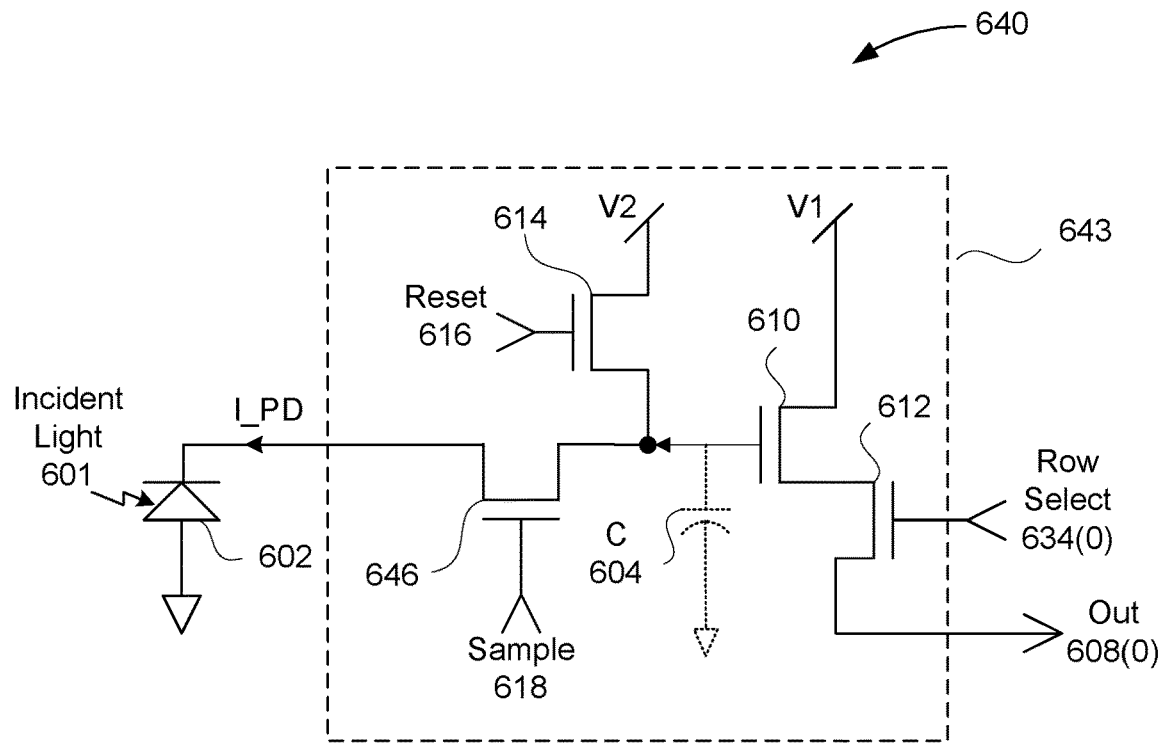
FIG. 6B illustrates a circuit diagram for a photosensitive cell, in accordance with another possible embodiment.
Figure 6C:
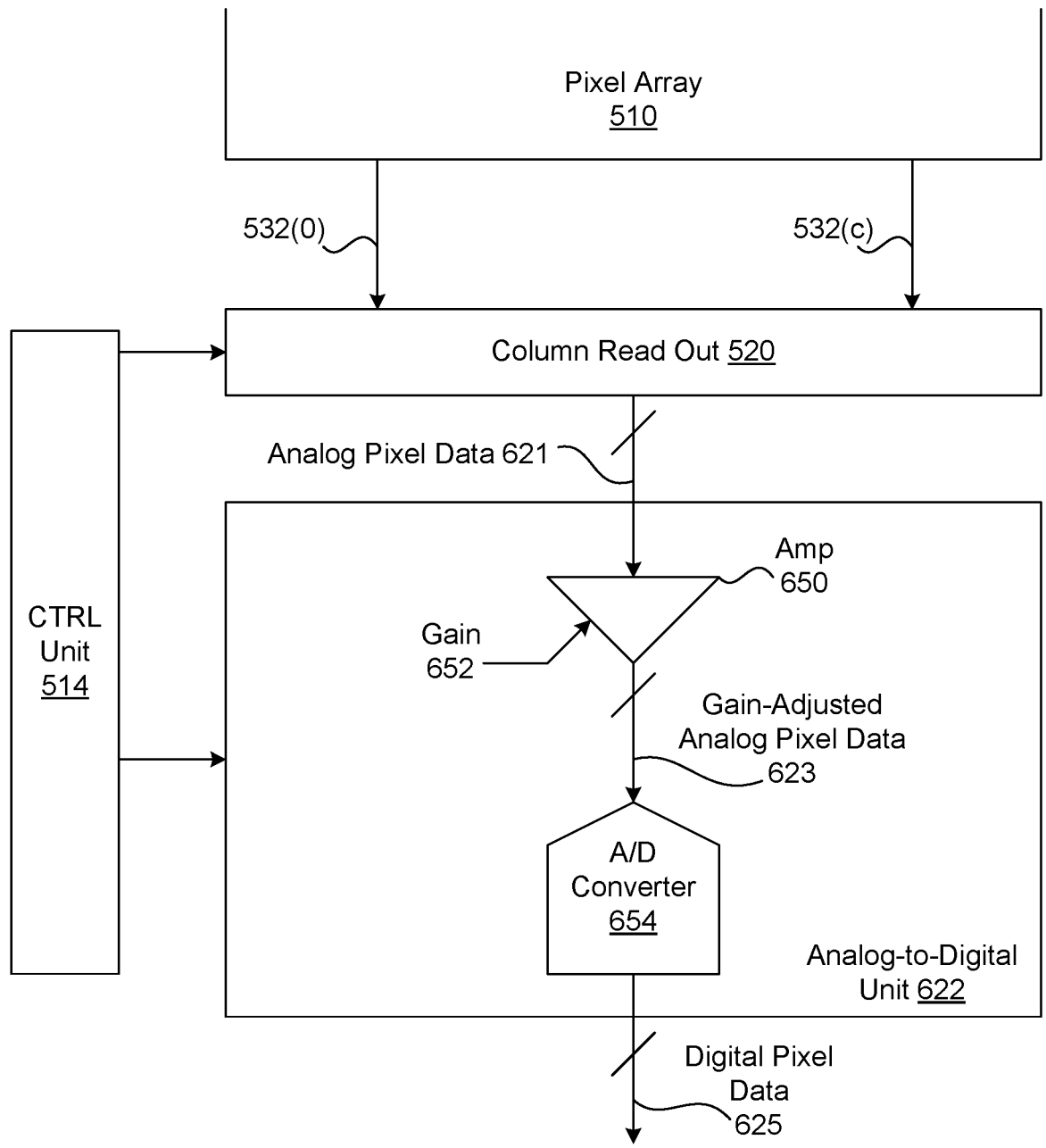
FIG. 6C illustrates a system for converting analog pixel data to digital pixel data, in accordance with an embodiment.

In one embodiment, the column read out circuit 520 may serve as a multiplexer to select and forward one or more received analog values to an analog-to-digital converter circuit, such as analog-to-digital unit 622 of FIG. 6C. The column read out circuit 520 may forward the received analog values in a predefined order or sequence. In one embodiment, row logic 512 asserts one or more row selection signals comprising row control signals 530, causing a corresponding row of pixels to transmit analog values through column signals 532. The column read out circuit 520 receives the analog values and sequentially selects and forwards one or more of the analog values at a time to the analog-to-digital unit 622. Selection of rows by row logic 512 and selection of columns by column read out circuit 620 may be directed by control unit 514. In one embodiment, rows 534 are sequentially selected to be read, starting with row 534(0) and ending with row 534(r), and analog values associated with sequential columns are transmitted to the analog-to-digital unit 622. In other embodiments, other selection patterns may be implemented to read analog values stored in pixels 540.

Further, the analog values forwarded by the column read out circuit 520 may comprise analog pixel data, which may later be amplified and then converted to digital pixel data for generating one or more digital images based on an optical image focused on the pixel array 510.

Figure 5B:
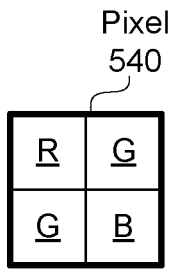
FIGS. 5B-5D illustrate three optional pixel configurations, according to one or more embodiments.
Figure 5C:
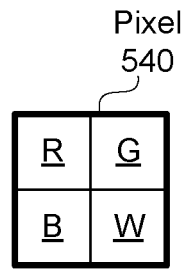
Figure 5D:
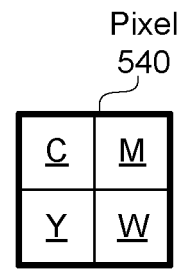

FIGS. 5B-5D illustrate three optional pixel configurations, according to one or more embodiments. As an option, these pixel configurations may be implemented in the context of the details of any of the Figures disclosed herein. Of course, however, these pixel configurations may be implemented in any desired environment. By way of a specific example, any of the pixels 540 of FIGS. 5B-5D may operate as one or more of the pixels 540 of the pixel array 510.

As shown in FIG. 5B, a pixel 540 is illustrated to include a first cell (R) for measuring red light intensity, second and third cells (G) for measuring green light intensity, and a fourth cell (B) for measuring blue light intensity, in accordance with one embodiment. As shown in FIG. 5C, a pixel 540 is illustrated to include a first cell (R) for measuring red light intensity, a second cell (G) for measuring green light intensity, a third cell (B) for measuring blue light intensity, and a fourth cell (W) for measuring white light intensity, in accordance with another embodiment. In one embodiment, chrominance pixel data for a pixel may be sampled by the first, second, and third cells (red, green, and blue), and luminance data for the pixel may be sampled by the fourth cell (white for unfiltered for red, green, or blue). As shown in FIG. 5D, a pixel 540 is illustrated to include a first cell (C) for measuring cyan light intensity, a second cell (M) for measuring magenta light intensity, a third cell (Y) for measuring yellow light intensity, and a fourth cell (W) for measuring white light intensity, in accordance with yet another embodiment.

Of course, while pixels 540 are each shown to include four cells, a pixel 540 may be configured to include fewer or more cells for measuring light intensity. Still further, in another embodiment, while certain of the cells of pixel 540 are shown to be configured to measure a single peak wavelength of light, or white light, the cells of pixel 540 may be configured to measure any wavelength, range of wavelengths of light, or plurality of wavelengths of light.

Figure 5E:
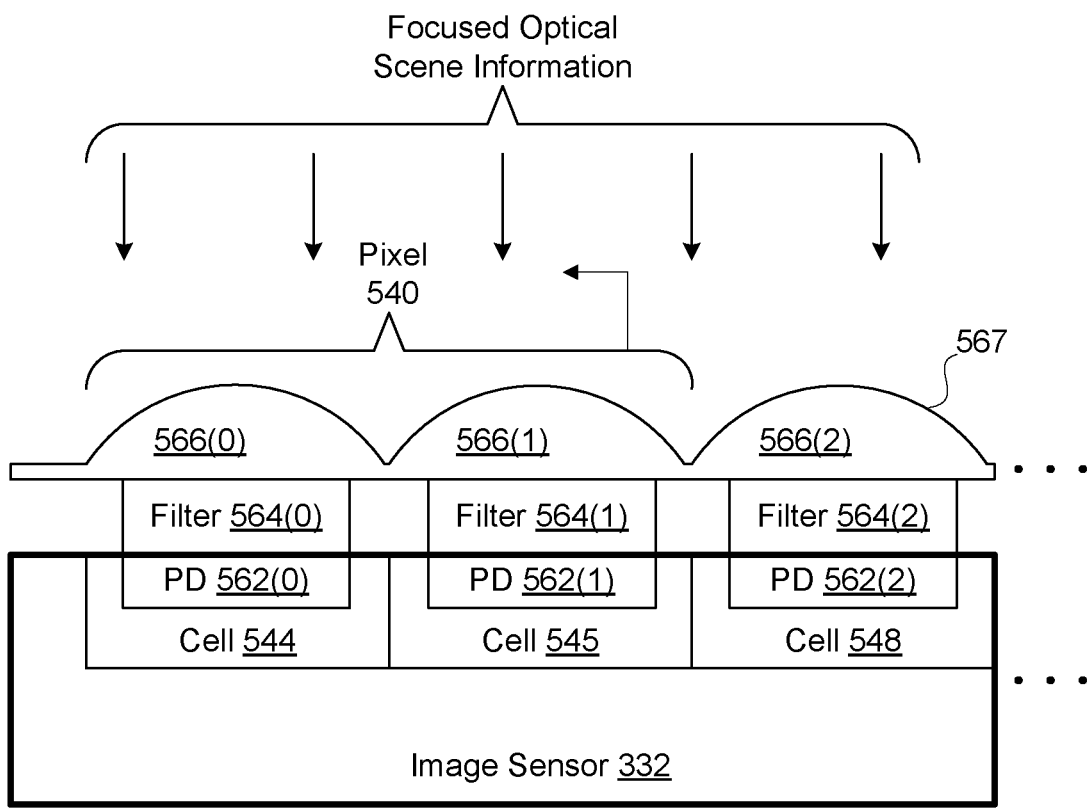
FIG. 5E illustrates a system is shown for capturing optical scene information focused as an optical image on an image sensor, in accordance with one embodiment.

Referring now to FIG. 5E, a system is shown for capturing optical scene information focused as an optical image on an image sensor 332, in accordance with one embodiment. As an option, the system of FIG. 5E may be implemented in the context of the details of any of the Figures. Of course, however, the system of FIG. 5E may be carried out in any desired environment. Further, the aforementioned definitions may equally apply to the description below.

As shown in FIG. 5E, an image sensor 332 is shown to include a first cell 544, a second cell 545, and a third cell 548. Further, each of the cells 544-548 is shown to include a photodiode 562. Still further, upon each of the photodiodes 562 is a corresponding filter 564, and upon each of the filters 564 is a corresponding microlens 566. For example, the cell 544 is shown to include photodiode 562(0), upon which is filter 564(0), and upon which is microlens 566(0). Similarly, the cell 545 is shown to include photodiode 562(1), upon which is filter 564(1), and upon which is microlens 566(1). Still yet, as shown in FIG. 5E, pixel 540 is shown to include each of cells 544 and 545, photodiodes 562(0) and 562(1), filters 564(0) and 564(1), and microlenses 566(0) and 566(1).

In one embodiment, each of the microlenses 566 may be any lens with a diameter of less than 50 microns. However, in other embodiments each of the microlenses 566 may have a diameter greater than or equal to 50 microns. In one embodiment, each of the microlenses 566 may include a spherical convex surface for focusing and concentrating received light on a supporting substrate beneath the microlens 566. For example, as shown in FIG. 5E, the microlens 566(0) focuses and concentrates received light on the filter 564(0). In one embodiment, a microlens array 567 may include microlenses 566, each corresponding in placement to photodiodes 562 within cells 544 of image sensor 332.

In the context of the present description, the photodiodes 562 may comprise any semiconductor diode that generates a potential difference, or changes its electrical resistance, in response to photon absorption. Accordingly, the photodiodes 562 may be used to detect or measure light intensity. Further, each of the filters 564 may be optical filters for selectively transmitting light of one or more predetermined wavelengths. For example, the filter 564(0) may be configured to selectively transmit substantially only green light received from the corresponding microlens 566(0), and the filter 564(1) may be configured to selectively transmit substantially only blue light received from the microlens 566(1). Together, the filters 564 and microlenses 566 may be operative to focus selected wavelengths of incident light on a plane. In one embodiment, the plane may be a 2-dimensional grid of photodiodes 562 on a surface of the image sensor 332. Further, each photodiode 562 receives one or more predetermined wavelengths of light, depending on its associated filter. In one embodiment, each photodiode 562 receives only one of red, blue, or green wavelengths of filtered light. As shown with respect to FIGS. 5B-5D, it is contemplated that a photodiode may be configured to detect wavelengths of light other than only red, green, or blue. For example, in the context of FIGS. 5C-5D specifically, a photodiode may be configured to detect white, cyan, magenta, yellow, or non-visible light such as infrared or ultraviolet light.

To this end, each coupling of a cell, photodiode, filter, and microlens may be operative to receive light, focus and filter the received light to isolate one or more predetermined wavelengths of light, and then measure, detect, or otherwise quantify an intensity of light received at the one or more predetermined wavelengths. The measured or detected light may then be represented as one or more analog values stored within a cell. For example, in one embodiment, each analog value may be stored within the cell utilizing a capacitor. Further, each analog value stored within a cell may be output from the cell based on a selection signal, such as a row selection signal, which may be received from row logic 512. Further still, each analog value transmitted from a cell may comprise one analog value in a plurality of analog values of an analog signal, where each of the analog values is output by a different cell. Accordingly, the analog signal may comprise a plurality of analog pixel data values from a plurality of cells. In one embodiment, the analog signal may comprise analog pixel data values for an entire image of a photographic scene. In another embodiment, the analog signal may comprise analog pixel data values for a subset of the entire image of the photographic scene. For example, the analog signal may comprise analog pixel data values for a row of pixels of the image of the photographic scene. In the context of FIGS. 5A-5E, the row 534(0) of the pixels 540 of the pixel array 510 may be one such row of pixels of the image of the photographic scene.

FIG. 6A illustrates a circuit diagram for a photosensitive cell 600, in accordance with one possible embodiment. As an option, the cell 600 may be implemented in the context of any of the Figures disclosed herein. Of course, however, the cell 600 may be implemented in any desired environment. Further, the aforementioned definitions may equally apply to the description below.

As shown in FIG. 6A, a photosensitive cell 600 includes a photodiode 602 coupled to an analog sampling circuit 603. The photodiode 602 may be implemented as any of the photodiodes 562 of FIG. 5E. In one embodiment, a unique instance of photosensitive cell 600 may implemented as each of cells 542-545 comprising a pixel 540 within the context of FIGS. 5A-5E. The analog sampling circuit 603 comprises transistors 610, 612, 614, and a capacitor 604. In one embodiment, each of the transistors 610, 612, and 614 may be a field-effect transistor.

The photodiode 602 may be operable to measure or detect incident light 601 of a photographic scene. In one embodiment, the incident light 601 may include ambient light of the photographic scene. In another embodiment, the incident light 601 may include light from a strobe unit utilized to illuminate the photographic scene. In yet another embodiment, the incident light 601 may include ambient light and/or light from a strobe unit, where the composition of the incident light 601 changes as a function of exposure time. For example, the incident light 601 may include ambient light during a first exposure time, and light from a strobe unit during a second exposure time. Of course, the incident light 601 may include any light received at and measured by the photodiode 602. Further still, and as discussed above, the incident light 601 may be concentrated on the photodiode 602 by a microlens, and the photodiode 602 may be one photodiode of a photodiode array that is configured to include a plurality of photodiodes arranged on a two-dimensional plane.

In one embodiment, each capacitor 604 may comprise gate capacitance for a transistor 610 and diffusion capacitance for transistor 614. The capacitor 604 may also include additional circuit elements (not shown) such as, without limitation, a distinct capacitive structure, such as a metal-oxide stack, a poly capacitor, a trench capacitor, or any other technically feasible capacitor structures.

With respect to the analog sampling circuit 603, when reset 616(0) is active (e.g., high), transistor 614 provides a path from voltage source V2 to capacitor 604, causing capacitor 604 to charge to the potential of V2. When reset 616(0) is inactive (e.g., low), the capacitor 604 I allowed to discharge in proportion to a photodiode current (I_PD) generated by the photodiode 602 in response to the incident light 601. In this way, photodiode current I_PD is integrated for an exposure time when the reset 616(0) is inactive, resulting in a corresponding voltage on the capacitor 604. This voltage on the capacitor 604 may also be referred to as an analog sample. In embodiments, where the incident light 601 during the exposure time comprises ambient light, the sample may be referred to as an ambient sample; and where the incident light 601 during the exposure time comprises flash or strobe illumination, the sample may be referred to as a flash sample. When row select 634(0) is active, transistor 612 provides a path for an output current from V1 to output 608(0). The output current is generated by transistor 610 in response to the voltage on the capacitor 604. When the row select 634(0) is active, the output current at the output 608(0) may therefore be proportional to the integrated intensity of the incident light 601 during the exposure time.

The sample may be stored in response to a photodiode current I_PD being generated by the photodiode 602, where the photodiode current I_PD varies as a function of the incident light 601 measured at the photodiode 602. In particular, a greater amount of incident light 601 may be measured by the photodiode 602 during a first exposure time including strobe or flash illumination than during a second exposure time including ambient illumination. Of course, characteristics of the photographic scene, as well as adjustment of various exposure settings, such as exposure time and aperture for example, may result in a greater amount of incident light 601 being measured by the photodiode 602 during the second exposure time including the ambient illumination than during the first exposure time including the strobe or flash illumination.

In one embodiment, the photosensitive cell 600 of FIG. 6A may be implemented in a pixel array associated with a rolling shutter operation. As shown in FIG. 6A, the components of the analog sampling circuit 603 do not include any mechanism for storing the analog sample for a temporary amount of time. Thus, the exposure time for a particular sample measured by the analog sampling circuit 603 may refer to the time between when reset 616(0) is driven inactive and the time when the row select 634(0) is driven active in order to generate the output current at output 608(0).

It will be appreciated that because each column of pixels in the pixel array 510 may share a single column signal 532 transmitted to the column read-out circuitry 520, and that a column signal 532 corresponds to the output 608(0), that analog values from only a single row of pixels may be transmitted to the column read-out circuitry 520 at a time. Consequently, the rolling shutter operation refers to a manner of controlling the plurality of reset signals 616 and row select signals 634 transmitted to each row 534 of pixels 540 in the pixel array 510. For example, a first reset signal 616(0) may be asserted to a first row 534(0) of pixels 540 in the pixel array 510 at a first time, t0. Subsequently, a second reset signal 616(1) may be asserted to a second row 534(1) of pixels 540 in the pixel array 510 at a second time, $t_1$, a third reset signal 616(2) may be asserted to a third row 534(2) of pixels 540 in the pixel array 510 at a third time, $t_2$, and so forth until the last reset signal 616(z) is asserted to a last row 534(z) of pixels 540 in the pixel array 510 at a last time, $t_z$. Thus, each row 534 of pixels 540 is reset sequentially from a top of the pixel array 510 to the bottom of the pixel array 510. In one embodiment, the length of time between asserting the reset signal 616 at each row may be related to the time required to read-out a row of sample data by the column read-out circuitry 520. In one embodiment, the length of time between asserting the reset signal 616 at each row may be related to the number of rows 534 in the pixel array 510 divided by an exposure time between frames of image data.

In order to sample all of the pixels 540 in the pixel array 510 with a consistent exposure time, each of the corresponding row select signals 634 are asserted a delay time after the corresponding reset signal 616 is reset for that row 534 of pixels 540, the delay time equal to the exposure time. The operation of sampling each row in succession, thereby capturing optical scene information for each row of pixels during different exposure time periods, may be referred to herein as a rolling shutter operation. While the circuitry included in an image sensor to perform a rolling shutter operation is simpler than other circuitry designed to perform a global shutter operation, discussed in more detail below, the rolling shutter operation can cause image artifacts to appear due to the motion of objects in the scene or motion of the camera. Objects may appear skewed in the image because the bottom of the object may have moved relative to the edge of a frame more than the top of the object when the analog signals for the respective rows 534 of pixels 540 were sampled.

FIG. 6B illustrates a circuit diagram for a photosensitive cell 640, in accordance with another possible embodiment. As an option, the cell 640 may be implemented in the context of any of the Figures disclosed herein. Of course, however, the cell 640 may be implemented in any desired environment. Further, the aforementioned definitions may equally apply to the description below.

As shown in FIG. 6B, a photosensitive cell 640 includes a photodiode 602 coupled to an analog sampling circuit 643. The photodiode 602 may be implemented as any of the photodiodes 562 of FIG. 5E. In one embodiment, a unique instance of photosensitive cell 640 may implemented as each of cells 542-545 comprising a pixel 540 within the context of FIGS. 5A-5E. The analog sampling circuit 643 comprises transistors 646, 610, 612, 614, and a capacitor 604. In one embodiment, each of the transistors 646, 610, 612, and 614 may be a field-effect transistor.

The transistors 610, 612, and 614 are similar in type and operation to the transistors 610, 612, and 614 of FIG. 6A. The transistor 646 may be similar in type to the transistors 610, 612, and 614, but the transistor 646 has the effect of turning capacitor 604 into an in-pixel-memory of an analog voltage value. In other words, the capacitor 604 is allowed to discharge in proportion to the photodiode current (I_PD) when the transistor 646 is active, and the capacitor 604 is prevented from discharging when the transistor 646 is inactive. The capacitor 604 may comprise gate capacitance for a transistor 610 and diffusion capacitance for transistors 614 and 646. The capacitor 604 may also include additional circuit elements (not shown) such as, without limitation, a distinct capacitive structure, such as a metal-oxide stack, a poly capacitor, a trench capacitor, or any other technically feasible capacitor structures. Unlike analog sampling circuit 603, analog sampling circuit 643 may be used to implement a global shutter operation where all pixels 540 in the pixel array are configured to generate a sample at the same time.

With respect to the analog sampling circuit 643, when reset 616 is active (e.g., high), transistor 614 provides a path from voltage source V2 to capacitor 604, causing capacitor 604 to charge to the potential of V2. When reset 616 is inactive (e.g., low), the capacitor 604 is allowed to discharge in proportion to a photodiode current (I_PD) generated by the photodiode 602 in response to the incident light 601 as long as the transistor 646 is active. Transistor 646 may be activated by asserting the sample signal 618, which is utilized to control the exposure time of each of the pixels 540. In this way, photodiode current I_PD is integrated for an exposure time when the reset 616 is inactive and the sample 618 is active, resulting in a corresponding voltage on the capacitor 604. After the exposure time is complete, the sample signal 618 may be reset to deactivate transistor 646 and stop the capacitor from discharging. When row select 634(0) is active, transistor 612 provides a path for an output current from V1 to output 608(0). The output current is generated by transistor 610 in response to the voltage on the capacitor 604. When the row select 634(0) is active, the output current at the output 608(0) may therefore be proportional to the integrated intensity of the incident light 601 during the exposure time.

In a global shutter operation, all pixels 540 of the pixel array 510 may share a global reset signal 616 and a global sample signal 618, which control charging of the capacitors 604 and discharging of the capacitors 604 through the photodiode current I_PD. This effectively measures the amount of incident light hitting each photodiode 602 substantially simultaneously for each pixel 540 in the pixel array 510. However, the external read-out circuitry for converting the analog values to digital values for each pixel may still require each row 534 of pixels 540 to be read out sequentially. Thus, after the global sample signal 618 is reset each corresponding row select signal 634 may be asserted and reset in order to read-out the analog values for each of the pixels. This is similar to the operation of the row select signal 634 in the rolling shutter operation except that the transistor 646 is inactive during this time such that any further accumulation of the charge in capacitor 604 is halted while all of the values are read.

It will be appreciated that other circuits for analog sampling circuits 603 and 643 may be implemented in lieu of the circuits set forth in FIGS. 6A and 6B, and that such circuits may be utilized to implement a rolling shutter operation or a global shutter operation, respectively. For example, the analog sampling circuits 603, 643 may include per cell amplifiers (e.g., op-amps) that provide a gain for the voltage stored in capacitor 604 when the read-out is performed. In other embodiments, an analog sampling circuit 643 may include other types of analog memory implementations decoupled from capacitor 604 such that the voltage of capacitor 604 is stored in the analog memory when the sample signal 618 is reset and capacitor 604 is allowed to continue to discharge through the photodiode 602. In yet another embodiment, each output 608 associated with a column of pixels may be coupled to a dedicated analog-to-digital converter (ADC) that enables the voltage at capacitor 604 to be sampled and converted substantially simultaneously for all pixels 540 in a row or portion of a row comprising the pixel array 510. In certain embodiments, odd rows and even rows may be similarly coupled to dedicated ADC circuits to provide simultaneous conversion of all color information for a given pixel. In one embodiment, a white color cell comprising a pixel is coupled to an ADC circuit configured to provide a higher dynamic range (e.g., 12 bits or 14 bits) than a dynamic range for ADC circuits coupled to a cell having color (e.g., red, green, blue) filters (e.g., 8 bits or 10 bits).

FIG. 6C illustrates a system for converting analog pixel data to digital pixel data, in accordance with an embodiment. As an option, the system of FIG. 6C may be implemented in the context of the details of any of the Figures disclosed herein. Of course, however, the system of FIG. 6C may be implemented in any desired environment. Further, the aforementioned definitions may equally apply to the description below.

As shown in FIG. 6C, analog pixel data 621 is received from column read out circuit 520 at analog-to-digital unit 622 under the control of control unit 514. The analog pixel data 621 may be received within an analog signal, as noted hereinabove. Further, the analog-to-digital unit 622 generates digital pixel data 625 based on the received analog pixel data 621. In one embodiment, a unique instance of analog pixel data 621 may include, as an ordered set of individual analog values, all analog values output from all corresponding analog sampling circuits or sample storage nodes. For example, in the context of the foregoing figures, each cell of cells 542-545 of a plurality of pixels 540 of a pixel array 510 may include an analog sampling circuit 603 or analog sampling circuit 643.

With continuing reference to FIG. 6C, the analog-to-digital unit 622 includes an amplifier 650 and an analog-to-digital converter 654. In one embodiment, the amplifier 650 receives an instance of analog pixel data 621 and a gain 652, and applies the gain 652 to the analog pixel data 621 to generate gain-adjusted analog pixel data 623. The gain-adjusted analog pixel data 623 is transmitted from the amplifier 650 to the analog-to-digital converter 654. The analog-to-digital converter 654 receives the gain-adjusted analog pixel data 623, and converts the gain-adjusted analog pixel data 623 to the digital pixel data 625, which is then transmitted from the analog-to-digital converter 654. In other embodiments, the amplifier 650 may be implemented within the column read out circuit 520 or in each individual cell instead of within the analog-to-digital unit 622. The analog-to-digital converter 654 may convert the gain-adjusted analog pixel data 623 to the digital pixel data 625 using any technically feasible analog-to-digital conversion technique.

In an embodiment, the gain-adjusted analog pixel data 623 results from the application of the gain 652 to the analog pixel data 621. In one embodiment, the gain 652 may be selected by the analog-to-digital unit 622. In another embodiment, the gain 652 may be selected by the control unit 514, and then supplied from the control unit 514 to the analog-to-digital unit 622 for application to the analog pixel data 621.

It should be noted, in one embodiment, that a consequence of applying the gain 652 to the analog pixel data 621 is that analog noise may appear in the gain-adjusted analog pixel data 623. If the amplifier 650 imparts a significantly large gain to the analog pixel data 621 in order to obtain highly sensitive data from the pixel array 510, then a significant amount of noise may be expected within the gain-adjusted analog pixel data 623. In one embodiment, the detrimental effects of such noise may be reduced by capturing the optical scene information at a reduced overall exposure. In such an embodiment, the application of the gain 652 to the analog pixel data 621 may result in gain-adjusted analog pixel data with proper exposure and reduced noise.

In one embodiment, the amplifier 650 may be a transimpedance amplifier (TIA). Furthermore, the gain 652 may be specified by a digital value. In one embodiment, the digital value specifying the gain 652 may be set by a user of a digital photographic device, such as by operating the digital photographic device in a "manual" mode. Still yet, the digital value may be set by hardware or software of a digital photographic device. As an option, the digital value may be set by the user working in concert with the software of the digital photographic device.

In one embodiment, a digital value used to specify the gain 652 may be associated with an ISO. In the field of photography, the ISO system is a well-established standard for specifying light sensitivity. In one embodiment, the amplifier 650 receives a digital value specifying the gain 652 to be applied to the analog pixel data 621. In another embodiment, there may be a mapping from conventional ISO values to digital gain values that may be provided as the gain 652 to the amplifier 650. For example, each of ISO 100, ISO 200, ISO 400, ISO 800, ISO 1600, etc. may be uniquely mapped to a different digital gain value, and a selection of a particular ISO results in the mapped digital gain value being provided to the amplifier 650 for application as the gain 652. In one embodiment, one or more ISO values may be mapped to a gain of 1. Of course, in other embodiments, one or more ISO values may be mapped to any other gain value.

Accordingly, in one embodiment, each analog pixel value may be adjusted in brightness given a particular ISO value. Thus, in such an embodiment, the gain-adjusted analog pixel data 623 may include brightness corrected pixel data, where the brightness is corrected based on a specified ISO. In another embodiment, the gain-adjusted analog pixel data 623 for an image may include pixels having a brightness in the image as if the image had been sampled at a certain ISO.

FIG. 7A illustrates a configuration of the camera module 330, in accordance with one embodiment. As shown in FIG. 7A, the camera module 330 may include two lenses 734 positioned above two image sensors 732. A first lens 734(0) is associated with a first image sensor 732(0) and focuses optical scene information 752(0) from a first viewpoint onto the first image sensor 732(0). A second lens 734(1) is associated with a second image sensor 732(1) and focuses optical scene information 752(1) from a second viewpoint onto the second image sensor 732(1).

In one embodiment, the first image sensor 732(0) may be configured to capture chrominance information associated with the scene and the second image sensor 732(1) may be configured to capture luminance information associated with the scene. The first image sensor 732(0) may be the same or different than the second image sensor 732(1). For example, the first image sensor 732(0) may be an 8 megapixel CMOS image sensor 732(0) having a Bayer color filter array (CFA), as shown in the arrangement of pixel 540 of FIG. 5B, that is configured to capture red, green, and blue color information; and the second image sensor 732(1) may be a 12 megapixel CMOS image sensor 732(1) having no color filter array (or a color filter array in which every cell is a white color filter) that is configured to capture intensity information (over substantially all wavelengths of the visible spectrum).

In operation, the camera module 330 may receive a shutter release command from the camera interface 386. The camera module 330 may reset both the first image sensor 732(0) and the second image sensor 732(1). One or both of the first image sensor 732(0) and the second image sensor 732(1) may then be sampled under ambient light conditions (i.e., the strobe unit 336 is disabled). In one embodiment, both the first image sensor 732(0) and the second image sensor 732(1) are sampled substantially simultaneously to generate a chrominance image and a luminance image under ambient illumination. Once the pair of images (chrominance image and luminance image) has been captured, one or more additional pairs of images may be captured under ambient illumination (e.g., using different exposure parameters for each pair of images) or under strobe illumination. The additional pairs of images may be captured in quick succession (e.g., less than 200 milliseconds between sampling each simultaneously captured pair) such that relative motion between the objects in the scene and the camera, or relative motion between two distinct objects in the scene, is minimized.

In the camera module 330, it may be advantageous to position the first lens 734(0) and first image sensor 732(0) proximate to the second lens 734(1) and the second image sensor 732(0) in order to capture the images of the scene from substantially the same viewpoint. Furthermore, direction of the field of view for both the first image sensor 732(0) and the second image sensor 732(1) should be approximately parallel. Unlike stereoscopic cameras configured to capture two images using parallax to represent depth of objects within the scene, the pair of images captured by the first image sensor 732(0) and the second image sensor 732(1) is not meant to capture displacement information for a given object from two disparate viewpoints.

One aspect of the invention is to generate a new digital image by combining the chrominance image with the luminance image to generate a more detailed image of a scene than could be captured with a single image sensor. In other words, the purpose of having two image sensors in the same camera module 330 is to capture different aspects of the same scene to create a blended image. Thus, care should be taken to minimize any differences between the images captured by the two image sensors. For example, positioning the first image sensor 732(0) and the second image sensor 732(1) close together may minimize image artifacts resulting from parallax of nearby objects. This may be the opposite approach taken for cameras designed to capture stereoscopic image data using two image sensors in which the distance between the two image sensors may be selected to mimic an intra-ocular distance of the human eyes.

In one embodiment, the images generated by the first image sensor 732(0) and the second image sensor 732(1) are close enough that blending the two images will not results in any image artifacts. In another embodiment, one of the images may be warped to match the other image to correct for the disparate viewpoints. There are many techniques available to warp one image to match another and any technically feasible technique may be employed to match the two images. For example, homography matrices may be calculated that describe the transformation from a portion (i.e., a plurality of pixels) of one image to a portion of another image. A homography matrix may describe a plurality of affine transformations (e.g., translation, rotation, scaling, etc.) that, when applied to a portion of an image, transform the portion of the image into another portion of a second image. By applying the homography matrices to various portions of the first image, the first image may be warped to match the second image. In this manner, any image artifacts resulting from blending the first image with the second image may be reduced.

In one embodiment, each of the image sensors 732 may be configured to capture an image using either a rolling shutter operation or a global shutter operation. The image sensors 732 may be configured to use the same type of shutter operation or different shutter operations. For example, the first image sensor 732(0) configured to capture chrominance information may be a cheaper image sensor that only includes analog sampling circuitry capable of implementing in a rolling shutter operation. In contrast, the second image sensor 732(1) configured to capture luminance information may be a more expensive image sensor that includes more advanced analog sampling circuitry capable of implementing a global shutter operation. Thus, the first image may be captured according to a rolling shutter operation while the second image may be captured according to a global shutter operation. Of course, both image sensors 732 may be configured to use the same shutter operation, either a rolling shutter operation or a global shutter operation. The type of shutter operation implemented by the image sensor 732 may be controlled by a control unit, such as control unit 514, included in the image sensor 732 and may be triggered by a single shutter release command.

FIG. 7B illustrates a configuration of the camera module 330, in accordance with another embodiment. As shown in FIG. 7B, the camera module 330 may include a lens 734 positioned above a beam splitter 736. The beam splitter 736 may act to split the optical information 752 received through the lens 734 into two separate transmission paths. The beam splitter 736 may be a cube made from two triangular glass prisms, a pellicle mirror like those typically utilized in single-lens reflex (SLR) cameras, or any other type of device capable of splitting a beam of light into two different directions. A first beam of light is directed onto the first image sensor 732(0) and a second beam of light is directed onto the second image sensor 732(1). In one embodiment, the first beam of light and the second beam of light include approximately the same optical information for the scene.

The two transmission paths focus the optical information 752 from the same viewpoint onto both the first image sensor 732(0) and the second image sensor 732(1). Because the same beam of light is split into two paths, it will be appreciated that intensity of light reaching each of the image sensors 732 is decreased. In order to compensate for the decrease in light reaching the image sensors, the exposure parameters can be adjusted (e.g., increasing the time between resetting the image sensor and sampling the image sensor to allow more light to activate the charge of each of the pixel sites). Alternatively, a gain applied to the analog signals may be increased, but this may also increase the noise in the analog signals as well.

Figure 7C:
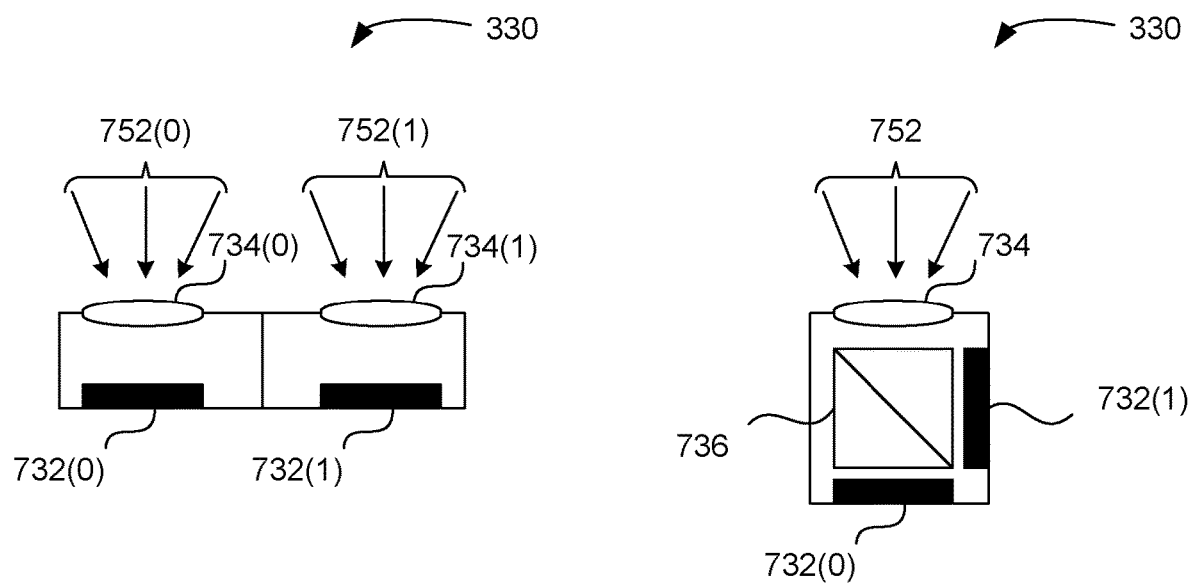
FIG. 7C illustrates a configuration of the camera module, in accordance with yet another embodiment.
Figure 7C:
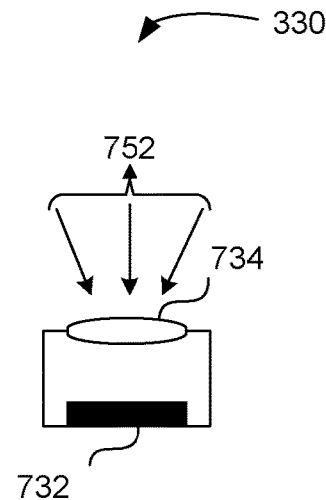

FIG. 7C illustrates a configuration of the camera module 330, in accordance with yet another embodiment. As shown in FIG. 7C, the camera module 330 may include a lens 734 positioned above a single image sensor 732. The optical information 752 is focused onto the image sensor 732 by the lens 734. In such embodiments, both the chrominance information and the luminance information may be captured by the same image sensor. A color filter array (CFA) may include a plurality of different color filters, each color filter positioned over a particular photodiode of the image sensor 732 to filter the wavelengths of light that are measured by that particular photodiode. Some color filters may be associated with photodiodes configured to measure chrominance information, such as red color filters, blue color filters, green color filters, cyan color filters, magenta color filters, or yellow color filters. Other color filters may be associated with photodiodes configured to measure luminance information, such as white color filters. As used herein, white color filters are filters that allow a substantially uniform amount of light across the visible spectrum to pass through the color filter. The color filters in the CFA may be arranged such that a first portion of the photodiodes included in the image sensor 732 capture samples for a chrominance image from the optical information 752 and a second portion of the photodiodes included in the image sensor 732 capture samples for a luminance image from the optical information 752.

In one embodiment, the each pixel in the image sensor 732 may be configured with a plurality of filters as shown in FIG. 5C. The photodiodes associated with the red, green, and blue color filters may capture samples included in the chrominance image as an RGB tuple. The photodiodes associated with the white color filter may capture samples included in the luminance image. It will be appreciated that each pixel 540 in the pixel array 510 of the image sensor 732 will produce one color in an RGB format stored in the chrominance image as well as an intensity value stored in a corresponding luminance image. In other words, the chrominance image and the luminance image will have the same resolution with one value per pixel.

In another embodiment, the each pixel in the image sensor 732 may be configured with a plurality of filters as shown in FIG. 5D. The photodiodes associated with the cyan, magenta, and yellow color filters may capture samples included in the chrominance image as a CMY tuple. The photodiodes associated with the white color filter may capture samples included in the luminance image. It will be appreciated that each pixel 540 in the pixel array 510 of the image sensor 732 will produce one color in a CMY format stored in the chrominance image as well as an intensity value stored in a corresponding luminance image.

In yet another embodiment, the CFA 460 may contain a majority of color filters for producing luminance information and a minority of color filters for producing chrominance information (e.g., 60% white, 10% red, 20% green, and 10% blue, etc.). Having a majority of the color filters being related to collecting luminance information will produce a higher resolution luminance image compared to the chrominance image. In one embodiment, the chrominance image has a lower resolution than the luminance image, due to the fewer number of photodiodes associated with the filters of the various colors. Furthermore, various techniques may be utilized to interpolate or "fill-in" values of either the chrominance image or the luminance image to fill in values associated with photodiodes that captured samples for the luminance image or chrominance image, respectively. For example, an interpolation of two or more values in the chrominance image or the luminance image may be performed to generate virtual samples in the chrominance image or the luminance image. It will be appreciated that a number of techniques for converting the raw digital pixel data associated with the individual photodiodes into a chrominance image and/or a luminance image may be implemented and is within the scope of the present invention.

Figure 8:
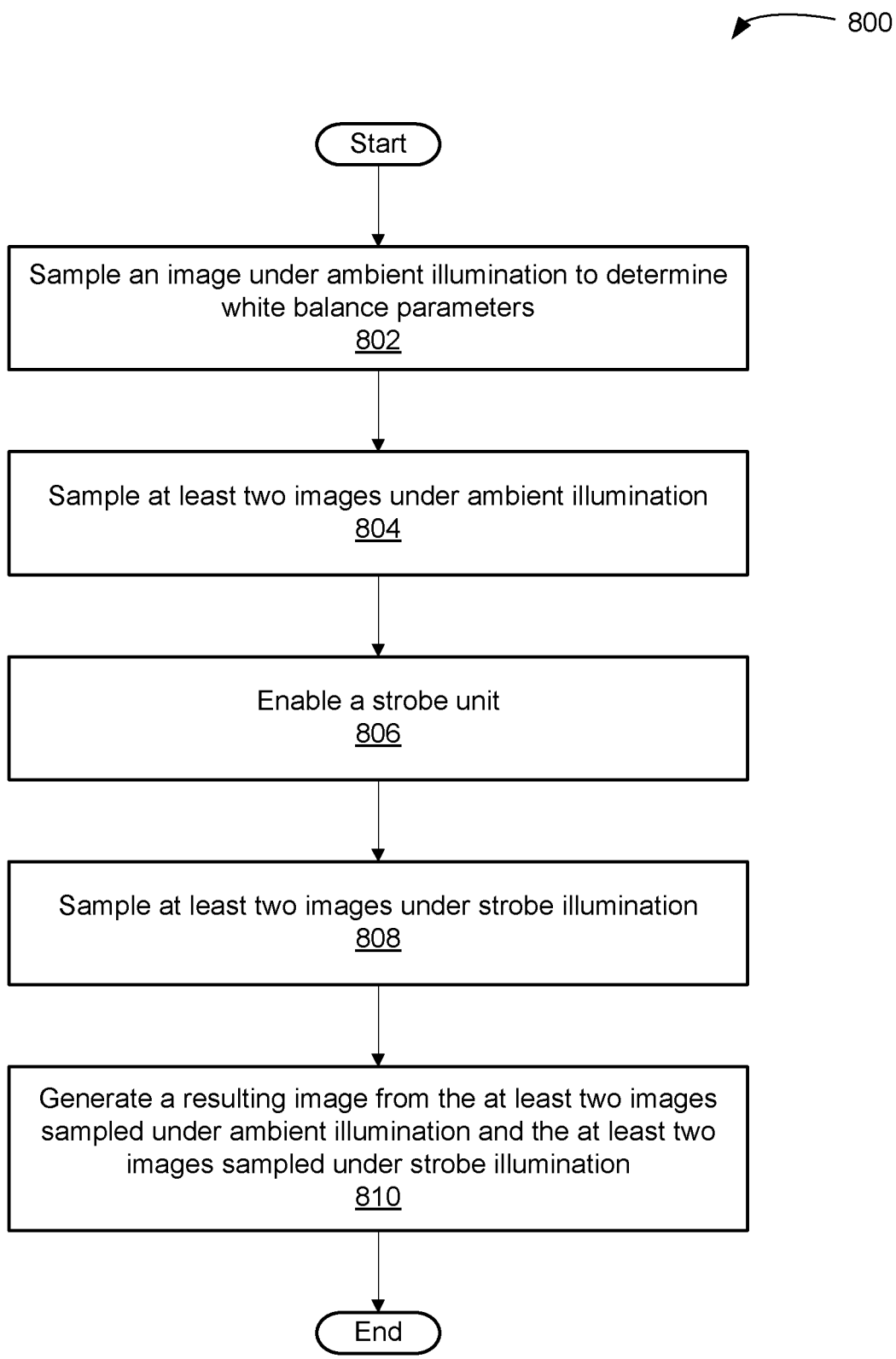
FIG. 8 illustrates a flow chart of a method for generating a digital image, in accordance with one embodiment.

FIG. 8 illustrates a flow chart of a method 800 for generating a digital image, in accordance with one embodiment. Although method 800 is described in conjunction with the systems of FIGS. 2-7C, persons of ordinary skill in the art will understand that any system that performs method 800 is within the scope and spirit of embodiments of the present invention. In one embodiment, a digital photographic system, such as digital photographic system 300 of FIG. 3A, is configured to perform method 800. The digital photographic system 300 may be implemented within a digital camera, such as digital camera 302 of FIG. 3C, or a mobile device, such as mobile device 376 of FIG. 3D.

The method 800 begins at step 802, where the digital photographic system 300 samples an image under ambient illumination to determine white balance parameters for the scene. For example, the white balance parameters may include separate linear scale factors for red, green, and blue for a gray world model of white balance. The white balance parameters may include quadratic parameters for a quadratic model of white balance, and so forth. In one embodiment, the digital photographic system 300 causes the camera module 330 to capture an image with one or more image sensors 332. The digital photographic system 300 may then analyze the captured image to determine appropriate white balance parameters. In one embodiment, the white balance parameters indicate a color shift to apply to all pixels in images captured with ambient illumination. In such an embodiment, the white balance parameters may be used to adjust images captured under ambient illumination. A strobe unit 336 may produce a strobe illumination of a pre-set color that is sufficient to reduce the color shift caused by ambient illumination. In another embodiment, the white balance parameters may identify a color for the strobe unit 336 to generate in order to substantially match the color of ambient light during strobe illumination. In such an embodiment, the strobe unit 336 may include red, green, and blue LEDs, or, separately, a set of discrete LED illuminators having different phosphor mixes that each produce different, corresponding chromatic peaks, to create color-controlled strobe illumination. The color-controlled strobe illumination may be used to match scene illumination for images captured under only ambient illumination and images captured under both ambient illumination and color-controlled strobe illumination.

At step 804, the digital photographic system 300 captures (i.e., samples) two or more images under ambient illumination. In one embodiment, the two or more images include a chrominance image 202 from a first image sensor 332(0) and a luminance image 204 from a second image sensor 332(1) that form an ambient image pair. The ambient image pair may be captured using a first set of exposure parameters.

In one embodiment, the two or more images may also include additional ambient image pairs captured successively using different exposure parameters. For example, a first image pair may be captured using a short exposure time that may produce an underexposed image. Additional image pairs may capture images with increasing exposure times, and a last image pair may be captured using a long exposure time that may produce an overexposed image. These images may form an image set captured under ambient illumination. Furthermore, these images may be combined in any technically feasible HDR blending or combining technique to generate an HDR image, including an HDR image rendered into a lower dynamic range for display. Additionally, these images may be captured using a successive capture rolling shutter technique, whereby complete images are captured at successively higher exposures by an image sensor before the image sensor is reset in preparation for capturing a new set of images.

At step 806, the digital photographic system 300 may enable a strobe unit 336. The strobe unit 336 may be enabled at a specific time prior to or concurrent with the capture of an image under strobe illumination. Enabling the strobe unit 336 should cause the strobe unit 336 to discharge or otherwise generate strobe illumination. In one embodiment, enabling the strobe unit 336 includes setting a color for the strobe illumination. The color may be set by specifying an intensity level of each of a red, green, and blue LED to be discharged substantially simultaneously; for example the color may be set in accordance with the white balance parameters.

At step 808, the digital photographic system 300 captures (i.e., samples) two or more images under strobe illumination. In one embodiment, the two or more images include a chrominance image 202 from a first image sensor 332(0) and a luminance image 204 from a second image sensor 332(1) that form a strobe image pair. The strobe image pair may be captured using a first set of exposure parameters.

In one embodiment, the two or more images may also include additional pairs of chrominance and luminance images captured successively using different exposure parameters. For example, a first image pair may be captured using a short exposure time that may produce an underexposed image. Additional image pairs may capture images with increasing exposure times, and a last image pair may be captured using a long exposure time that may produce an overexposed image. The changing exposure parameters may also include changes to the configuration of the strobe illumination unit 336, such as an intensity of the discharge or a color of the discharge. These images may form an image set captured under strobe illumination. Furthermore, these images may be combined in any technically feasible HDR blending or combining technique to generate an HDR image, including an HDR image rendered into a lower dynamic range for display. Additionally, these images may be captured using a successive capture rolling shutter technique, whereby complete images are captured at successively higher exposures by an image sensor before the image sensor is reset in preparation for capturing a new set of images.

At step 810, the digital photographic system 300 generates a resulting image from the at least two images sampled under ambient illumination and the at least two images sampled under strobe illumination. In one embodiment, the digital photographic system 300 blends the chrominance image sampled under ambient illumination with the chrominance image sampled under strobe illumination. In another embodiment, the digital photographic system 300 blends the luminance image sampled under ambient illumination with the luminance image sampled under strobe illumination. In yet another embodiment, the digital photographic system 300 may blend a chrominance image sampled under ambient illumination with a chrominance image sampled under strobe illumination to generate a consensus chrominance image, such as through averaging, or weighted averaging. The consensus chrominance image may then be blended with a selected luminance image, the selected luminance image being sampled under ambient illumination or strobe illumination, or a combination of both luminance images.

In one embodiment, blending two images may include performing an alpha blend between corresponding pixel values in the two images. In such an embodiment, the alpha blend weight may be determined by one or more pixel attributes (e.g., intensity) of a pixel being blended, and may be further determined by pixel attributes of surrounding pixels. In another embodiment, blending the two images may include, for each pixel in the resulting image, determining whether a corresponding pixel in a first image captured under ambient illumination is underexposed. If the pixel is underexposed, then the pixel in the resulting image is selected from the second image captured under strobe illumination. Blending the two images may also include, for each pixel in the resulting image, determining whether a corresponding pixel in a second image captured under strobe illumination is overexposed. If the pixel is overexposed, then the pixel in the resulting image is selected from the first image captured under ambient illumination. If pixel in the first image is not underexposed and the pixel in the second image is not overexposed, then the pixel in the resulting image is generated based on an alpha blend between corresponding pixel values in the two images. Furthermore, any other blending technique or techniques may be implemented in this context without departing the scope and spirit of embodiments of the present invention.

In one embodiment, the at least two images sampled under ambient illumination may include two or more pairs of images sampled under ambient illumination utilizing different exposure parameters. Similarly, the at least two images sampled under strobe illumination may include two or more pairs of images sampled under strobe illumination utilizing different exposure parameters. In such an embodiment, blending the two images may include selecting two pairs of images captured under ambient illumination and selecting two pairs of images captured under strobe illumination. The two pairs of images sampled under ambient illumination may be blended using any technically feasible method to generate a blended pair of images sampled under ambient illumination. Similarly, the two pairs of images sampled under strobe illumination may be blended using any technically feasible method to generate a blended pair of images sampled under strobe illumination. Then, the blended pair of images sampled under ambient illumination may be blended with the blended pair of images sampled under strobe illumination.

Figure 9A:
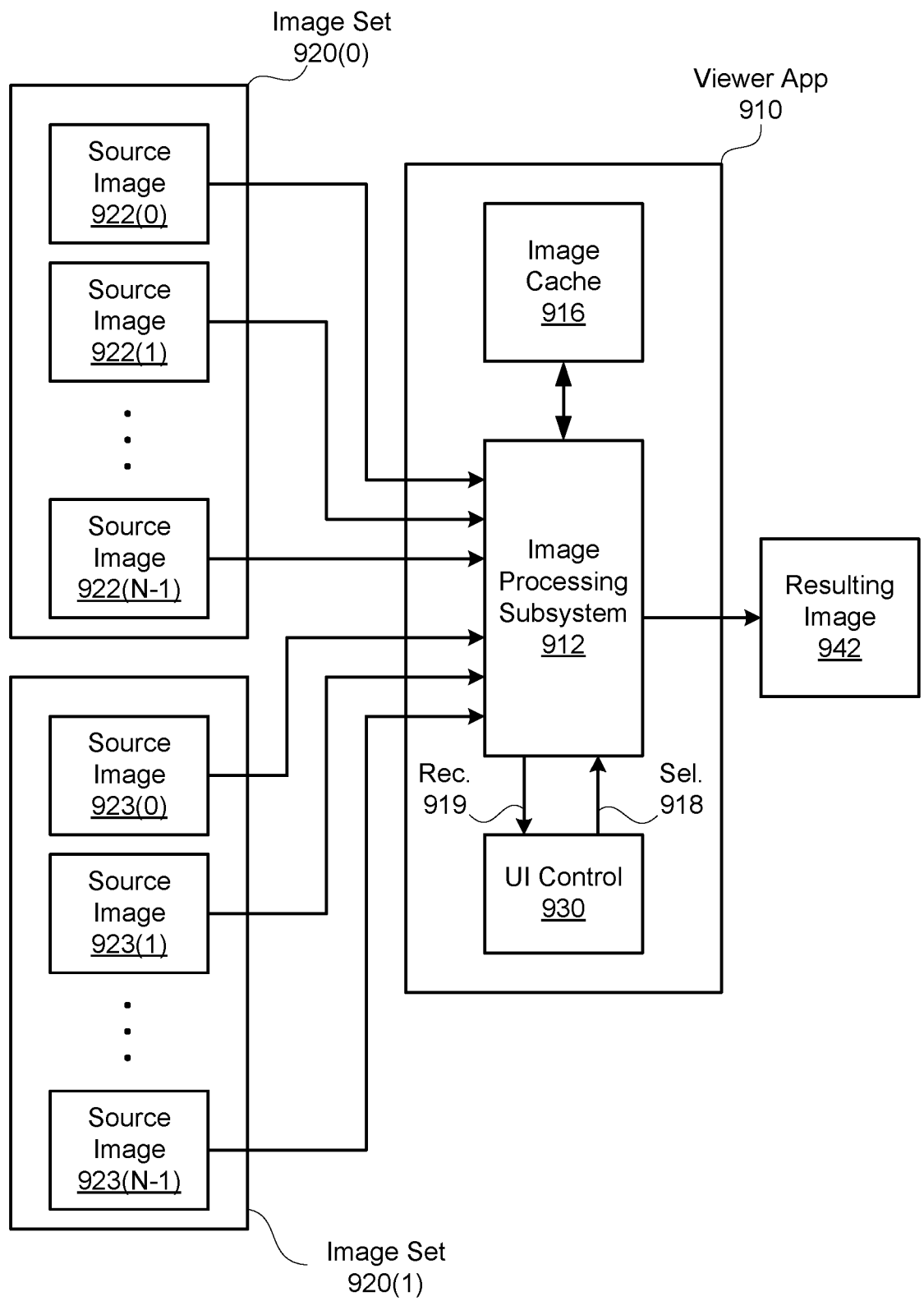
FIG. 9A illustrates a viewer application configured to generate a resulting image based two image sets, in accordance with one embodiment.

FIG. 9A illustrates a viewer application 910 configured to generate a resulting image 942 based two image sets 920, in accordance with one embodiment. A first image set 920(0) includes two or more source images 922, which may be generated by sampling a first image sensor 732(0) of the camera module 330. The source images 922 may correspond to chrominance images. A second image set 920(1) includes two or more source images 923, which may be generated by sampling a second image sensor 732(1) of the camera module 330. The source images 923 may correspond to luminance images. Each source image 922 in the first image set 920(0) has a corresponding source image 923 in the second image set 920(1). In another embodiment, the source images 922 may be generated by sampling a first portion of photodiodes in an image sensor 732 and the source images 923 may be generated by sampling a second portion of photodiodes in the image sensor 732.

In one embodiment, the resulting image 942 represents a pair of corresponding source images 922(*i*), 923(*i*) that are selected from the image set 920(0) and 920(1), respectively, and blended using a color space blend technique, such as the HSV technique described above in conjunction with FIGS. 1 & 2. The pair of corresponding source images may be selected according to any technically feasible technique. For example, a given source image 922 from the first image set 920(0) may be selected automatically based on exposure quality. Then, a corresponding source image 923 from the second image set 920(1) may be selected based on the source image 922 selected in the first image set 920(0).

Alternatively, a pair of corresponding source images may be selected manually through a UI control 930, discussed in greater detail below in FIG. 9B. The UI control 930 generates a selection parameter 918 that indicates the manual selection. An image processing subsystem 912 is configured to generate the resulting image 942 by blending the selected source image 922 with the corresponding source image 923. In certain embodiments, the image processing subsystem 912 automatically selects a pair of corresponding source images and transmits a corresponding recommendation 919 to the UI control 930. The recommendation 919 indicates, through the UI control 930, which pair of corresponding source images was automatically selected. A user may keep the recommendation or select a different pair of corresponding source images using the UI control 930.

In an alternative embodiment, viewer application 910 is configured to combine two or more pairs of corresponding source images to generate a resulting image 942. The two or more pairs of corresponding source images may be mutually aligned by the image processing subsystem 912 prior to being combined. Selection parameter 918 may include a weight assigned to each of two or more pairs of corresponding source images. The weight may be used to perform a transparency/opacity blend (known as an alpha blend) between two or more pairs of corresponding source images.

In certain embodiments, source images 922(0) and 923(0) are sampled under exclusively ambient illumination, with the strobe unit off. Source image 922(0) is generated to be white-balanced, according to any technically feasible white balancing technique. Source images 922(1) through 922(N−1) as well as corresponding source images 923(1) though 923(N−1) are sampled under strobe illumination, which may be of a color that is discordant with respect to ambient illumination. Source images 922(1) through 922(N−1) may be white-balanced according to the strobe illumination color. Discordance in strobe illumination color may cause certain regions to appear incorrectly colored with respect to other regions in common photographic settings. For example, in a photographic scene with foreground subjects predominantly illuminated by white strobe illumination and white-balanced accordingly, background subjects that are predominantly illuminated by incandescent lights may appear excessively orange or even red.

In one embodiment, spatial color correction is implemented within image processing subsystem 912 to match the color of regions within a selected source image 922 to that of source image 922(0). Spatial color correction implements regional color-matching to ambient-illuminated source image 922(0). The regions may range in overall scene coverage from individual pixels, to blocks of pixels, to whole frames. In one embodiment, each pixel in a color-corrected image includes a weighted color correction contribution from at least a corresponding pixel and an associated block of pixels.

In certain implementations, viewer application 910 includes an image cache 916, configured to include a set of cached images corresponding to the source images 922, but rendered to a lower resolution than source images 922. The image cache 916 provides images that may be used to readily and efficiently generate or display resulting image 942 in response to real-time changes to selection parameter 918. In one embodiment, the cached images are rendered to a screen resolution of display unit 312. When a user manipulates the UI control 930 to select a pair of corresponding source images, a corresponding cached image may be displayed on the display unit 312. The cached images may represent a down-sampled version of a resulting image 942 generated based on the selected pair of corresponding source images. Caching images may advantageously reduce power consumption associated with rendering a given corresponding pair of source images for display. Caching images may also improve performance by eliminating a rendering process needed to resize a given corresponding pair of source images for display each time UI control 530 detects that a user has selected a different corresponding pair of source images.

Figure 9B:
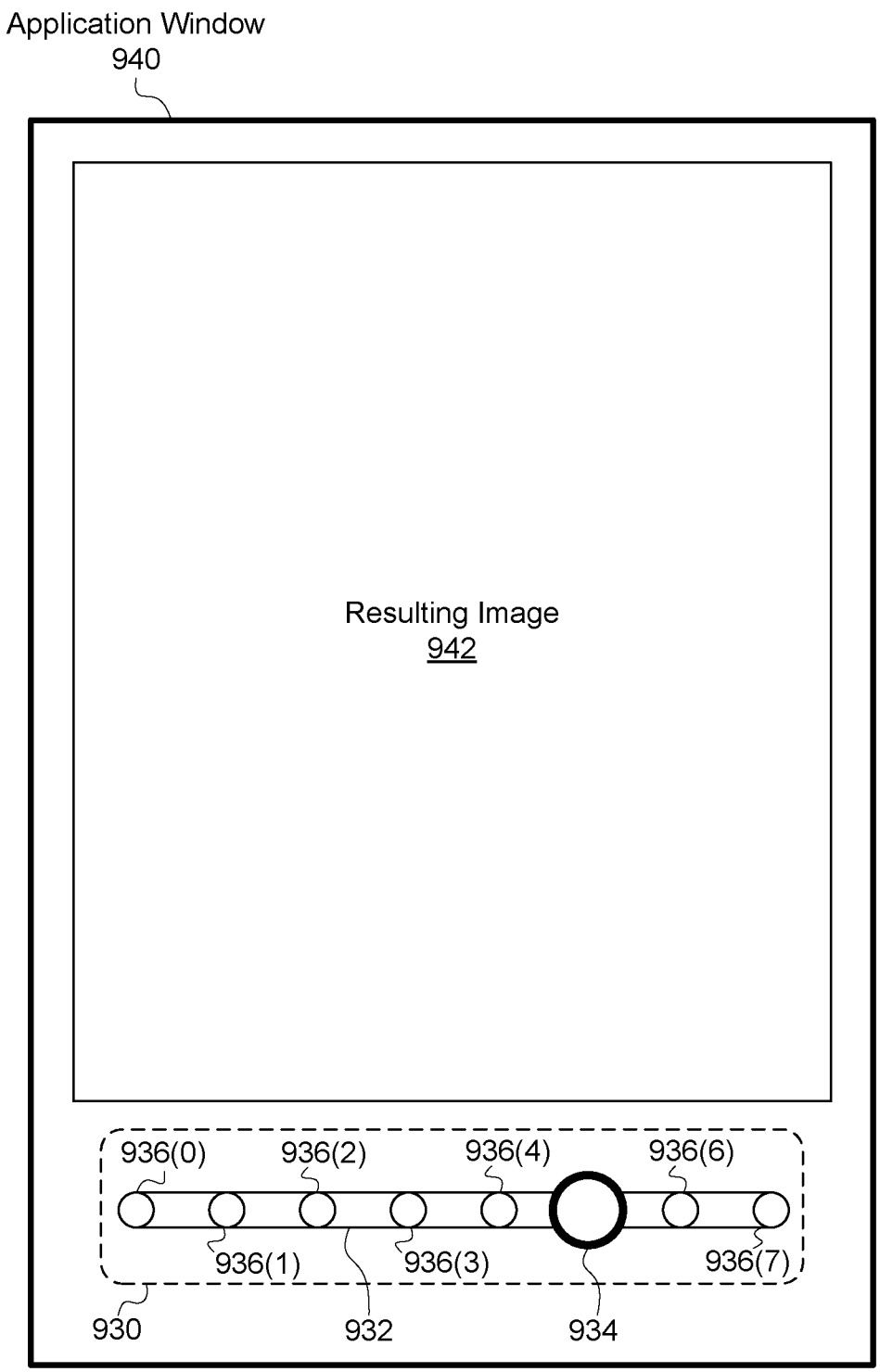
FIG. 9B illustrates an exemplary user interface associated with the viewer application 910 of FIG. 9A, in accordance with one embodiment.

FIG. 9B illustrates an exemplary user interface associated with the viewer application 910 of FIG. 9A, in accordance with one embodiment. The user interface comprises an application window 940 configured to display the resulting image 942 based on a position of the UI control 930. The viewer application 910 may invoke the UI control 930, configured to generate the selection parameter 918 based on a position of a control knob 934. The recommendation 919 may determine an initial position of the control knob 934, corresponding to a recommended corresponding pair of source images. In one embodiment, the UI control 930 comprises a linear slider control with a control knob 934 configured to slide along a slide path 932. A user may position the control knob 934 by performing a slide gesture. For example, the slide gesture may include touching the control knob 934 in a current position, and sliding the control knob 934 to a new position. Alternatively, the user may touch along the slide path 932 to move the control knob 934 to a new position defined by a location of the touch.

In one embodiment, positioning the control knob 934 into a discrete position 936 along the slide path 932 causes the selection parameter 918 to indicate selection of a source image 922(*i*) in the first image set 920(0) and a corresponding source image 923 in the second image set 920(1). For example, a user may move control knob 934 into discrete position 936(3), to indicate that source image 922(3) and corresponding source image 923(3) are selected. The UI control 930 then generates selection parameter 918 to indicate that source image 922(3) and corresponding source image 923(3) are selected. The image processing subsystem 912 responds to the selection parameter 918 by generating the resulting image 942 based on source image 922(3) and corresponding source image 923(3). The control knob 934 may be configured to snap to a closest discrete position 936 when released by a user withdrawing their finger.

In an alternative embodiment, the control knob 934 may be positioned between two discrete positions 936 to indicate that resulting image 942 should be generated based on two corresponding pairs of source images. For example, if the control knob 934 is positioned between discrete position 936(3) and discrete position 936(4), then the image processing subsystem 912 generates resulting image 942 from source images 922(3) and 922(4) as well as source images 923(3) and 923(4). In one embodiment, the image processing subsystem 912 generates resulting image 942 by aligning source images 922(3) and 922(4) as well as source images 923(3) and 923(4), and performing an alpha-blend between the aligned images according to the position of the control knob 934. For example, if the control knob 934 is positioned to be one quarter of the distance from discrete position 936(3) to discrete position 936(4) along slide path 932, then an aligned image corresponding to source image 922(4) may be blended with twenty-five percent opacity (seventy-five percent transparency) over a fully opaque aligned image corresponding to source image 922(3).

In one embodiment, UI control 930 is configured to include a discrete position 936 for each source image 922 within the first image set 920(0). Each image set 920 stored within the digital photographic system 300 of FIG. 3A may include a different number of source images 922, and UI control 930 may be configured to establish discrete positions 936 to correspond to the source images 922 for a given image set 920.

Figure 9C:
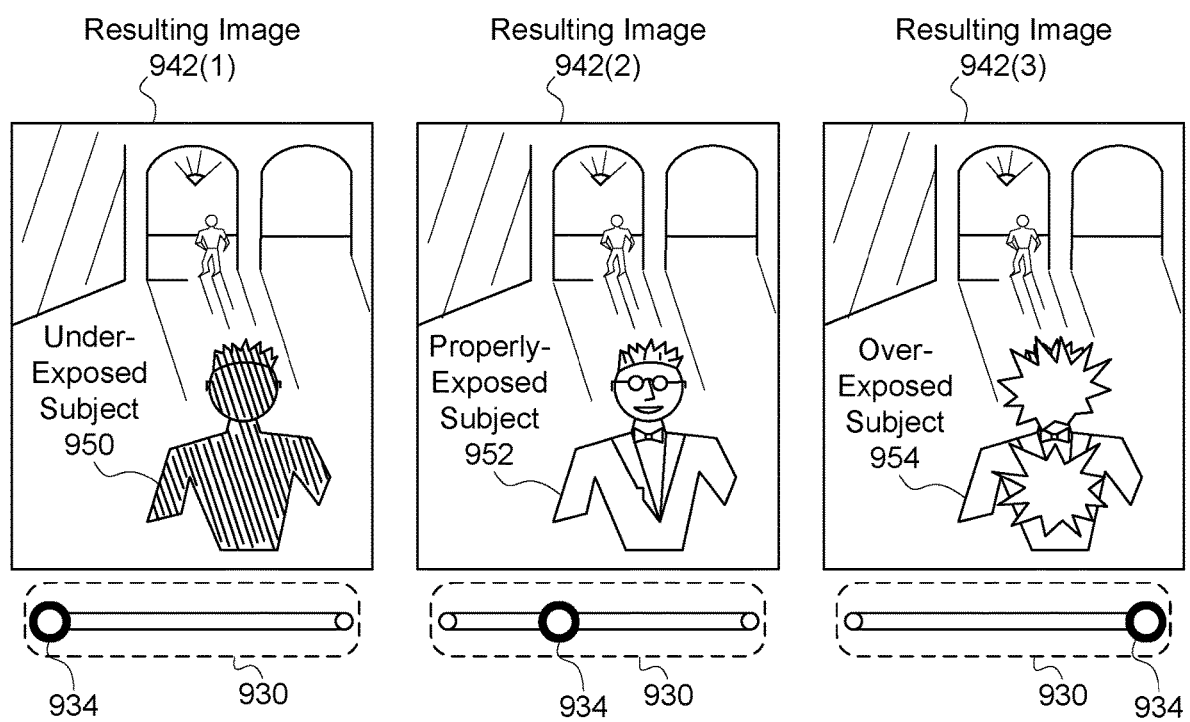
FIG. 9C illustrates a resulting image with differing levels of strobe exposure, in accordance with one embodiment.

FIG. 9C illustrates a resulting image 942 with differing levels of strobe exposure, in accordance with one embodiment. In this example, control knob 934 is configured to select source images 922 of FIG. 9A sampled under increasing strobe intensity from left to right. When the control knob 934 is in the left-most position, the selected source image may correspond to source image 922(0) captured under ambient illumination. When the control knob 934 is in the right-most position, the selected source image may correspond to source image 922(N−1) captured with strobe illumination. When the control knob 934 is in an intermediate position, the selected source image may correspond to one of the other source images 922(1)-922(N−2).

In one embodiment, the source images 922 may include more than one source image captured under ambient illumination. Source images 922 may include P images captured under ambient illumination using different exposure parameters. For example, source images 922 may include four images captured under ambient illumination with increasing exposure times. Similarly, the source images 922 may include more than one source image captured under strobe illumination.

As shown, resulting image 942(1) includes an under-exposed subject 950 sampled under insufficient strobe intensity, resulting image 942(2) includes a properly-exposed subject 952 sampled under appropriate strobe intensity, and resulting image 942(3) includes an over-exposed subject 954 sampled under excessive strobe intensity. A determination of appropriate strobe intensity is sometimes subjective, and embodiments of the present invention advantageously enable a user to subjectively select an image having a desirable or appropriate strobe intensity after a picture has been taken, and without loss of image quality or dynamic range. In practice, a user is able to take what is apparently one photograph by asserting a single shutter-release. The single shutter-release causes the digital photographic system 300 of FIG. 3A to sample multiple images in rapid succession, where each of the multiple images is sampled under varying strobe intensity. In one embodiment, time intervals of less than two-hundred milliseconds are defined herein to establish rapid succession. Again, the multiple images may include both chrominance images and corresponding luminance images. A resulting image set 920 enables the user to advantageously select a resulting image 942 later, such as after a particular photographic scene of interest is no longer available. This is in contrast to prior art solutions that conventionally force a user to manually take different photographs and manually adjust strobe intensity over the different photographs. This manual prior art process typically introduces substantial inter-image delay, resulting in a loss of content consistency among sampled images.

Figure 9D:
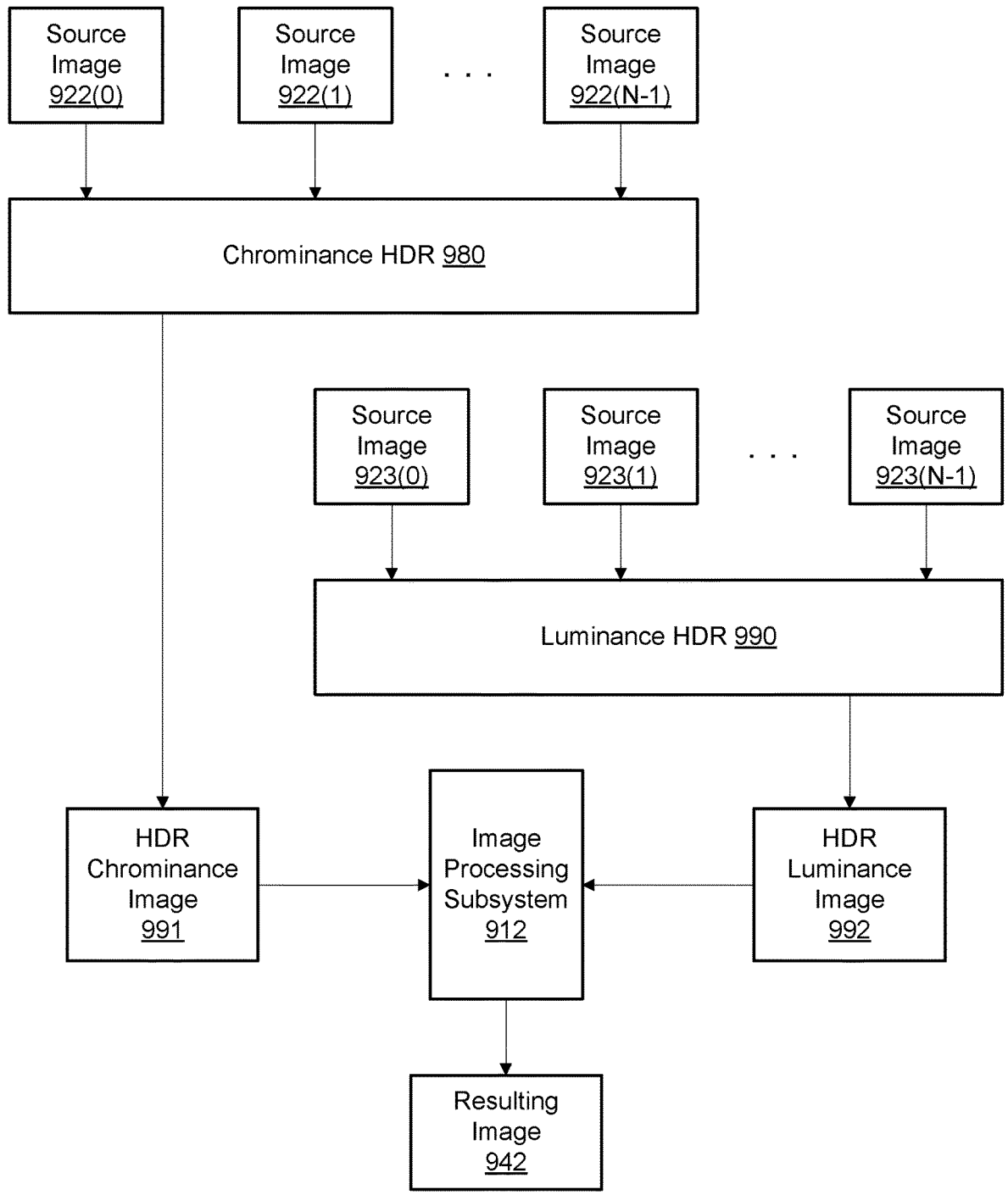
FIG. 9D illustrates a system for generating a resulting image from a high dynamic range chrominance image and a high dynamic range luminance image, in accordance with one embodiment.

FIG. 9D illustrates a system for generating a resulting image from a high dynamic range chrominance image and a high dynamic range luminance image, in accordance with one embodiment. The image sets 920 enable a user to generate a high dynamic range (HDR) image. For example, the sensitivity of an image sensor is limited. While some portions of the scene are bright, other portions may be dim. If the brightly lit portions of the scene are captured within the dynamic range of the image sensor, then the dimly lit portions of the scene may not be captured with sufficient detail (i.e., the signal to noise ratio at low analog values may not allow for sufficient details to be seen). In such cases, the image sets may be utilized to create HDR versions of both the chrominance image and the luminance image. In certain embodiments, luminance images may be sampled at an inherently higher analog dynamic range, and in one embodiment, one luminance image provides an HDR image for luminance.

A chrominance HDR module 980 may access two or more of the source images 922 to create an HDR chrominance image 991 with a high dynamic range. Similarly a luminance HDR module 990 may access two or more of the source images 923 to create an HDR luminance image 992 with a high dynamic range. The chrominance HDR module 980 and the luminance HDR module 990 may generate HDR images under any feasible technique, including techniques well-known in the art. The image processing subsystem 912 may then combine the HDR chrominance image 991 with the HDR luminance image 992 to generate the resulting image 942 as described above with respect to a single source image 922 and a single corresponding source image 923.

One advantage of the present invention is that a user may photograph a scene using a single shutter release command, and subsequently select an image sampled according to a strobe intensity that best satisfies user aesthetic requirements for the photographic scene. The one shutter release command causes a digital photographic system to rapidly sample a sequence of images with a range of strobe intensity and/or color. For example, twenty or more full-resolution images may be sampled within one second, allowing a user to capture a potentially fleeting photographic moment with the advantage of strobe illumination. Furthermore, the captured images may be captured using one or more image sensors for capturing separate chrominance and luminance information. The chrominance and luminance information may then be blended to produce the resulting images.

While various embodiments have been described above with respect to a digital camera 302 and a mobile device 376, any device configured to perform at least one aspect described herein is within the scope and spirit of the present invention. In certain embodiments, two or more digital photographic systems implemented in respective devices are configured to sample corresponding image sets in mutual time synchronization. A single shutter release command may trigger the two or more digital photographic systems.

While the foregoing is directed to embodiments of the present invention, other and further embodiments of the invention may be devised without departing from the basic scope thereof, and the scope thereof is determined by the claims that follow.

What is claimed is:

1. A system, comprising:
a first image sensor configured to capture a first image and a second image, wherein the first image sensor detects wavelengths of a visible spectrum, and at least one of the first image or the second image is sampled under strobe illumination using a strobe unit;
a second image sensor configured to capture a third image and a fourth image, wherein the second image sensor detects wavelengths of a non-visible spectrum, and at least one of the third image or the fourth image is sampled under strobe illumination using the strobe unit; and
an image processing subsystem configured to generate a resulting image by combining at least three of: the first image, the second image, the third image, or the fourth image.

2. The system of claim 1, further comprising:
a first lens that focuses light from a photographic scene onto the first image sensor, and
a second lens that focuses light from the photographic scene onto the second image sensor.

3. The system of claim 1, further comprising a lens that focuses light from a photographic scene onto a beam splitter that is configured to split the light from the photographic scene onto the first image sensor and the second image sensor.

4. The system of claim 1, wherein the first image sensor comprises a first portion of photodiodes included in a photodiode array, and the second image sensor comprises a second portion of photodiodes included in the photodiode array.

5. The system of claim 1, wherein the first image sensor and the second image sensor sample images utilizing a global shutter operation.

6. The system of claim 1, wherein the first image sensor and the second image sensor sample images utilizing a rolling shutter operation.

7. The system of claim 1, wherein one of the first image sensor and the second image sensor samples images utilizing a rolling shutter operation and the other of the first image sensor and the second image sensor samples images utilizing a global shutter operation.

8. The system of claim 1, wherein the strobe unit used for the strobe illumination includes a red light-emitting diode (LED), a green LED, and a blue LED.

9. The system of claim 8, wherein the first image sensor is configured to capture at least one of the first image or the second image under ambient illumination, and the image processing subsystem is configured to analyze one of the first image or the second image to determine a white balance setting, and enable the strobe unit to provide the strobe illumination of a particular color based on the white balance setting.

10. The system of claim 1, wherein the resulting image is generated by:
for each pixel in the resulting image:
determining a corresponding pixel in the first image, wherein the corresponding pixel in the first image is associated with a color specified by a red value, a green value, and a blue value;
converting the color specified by the red value, the green value, and the blue value into a Hue-Saturation-Value model that specifies the color using a Hue value, a Saturation value, and a Value value;
determining a corresponding pixel in each of the second image, the third image, and the fourth image, wherein the corresponding pixel in the second image, the third image, and the fourth image is associated with an intensity value; and
combining the intensity value with the Hue value and the Saturation value to specify a color for the pixel in the resulting image.

11. The system of claim 1, wherein the first image sensor, the second image sensor, and the image processing subsystem are included in at least one of a wireless mobile device or a digital camera.

12. The system of claim 1, wherein at least one of the third image or the fourth image includes infrared intensity information or ultraviolet intensity information.

13. A method, comprising:
receiving a first image and a second image from a first image sensor, wherein the first image sensor detects wavelengths of a visible spectrum, and at least one of the first image or the second image is sampled under strobe illumination using a strobe unit;
receiving a third image and a fourth image from a second image sensor, wherein the second image sensor detects wavelengths of a non-visible spectrum, and at least one of the third image or the fourth image is sampled under strobe illumination using the strobe unit; and
generating, using an image processing subsystem, a resulting image by combining at least three of: the first image, the second image, the third image, or the fourth image.

14. The method of claim 13, wherein generating the resulting image comprises:
for each pixel in the resulting image:
determining a corresponding pixel in the first image, wherein the corresponding pixel in the first image is associated with a color specified by a red value, a green value, and a blue value;
converting the color specified by the red value, the green value, and the blue value into a Hue-Saturation-Value model that specifies the color using a Hue value, a Saturation value, and a Value value;
determining a corresponding pixel in each of the second image, the third image, and the fourth image, wherein the corresponding pixel in the second image, the third image, and the fourth image is associated with an intensity value; and
combining the intensity value with the Hue value and the Saturation value to specify a color for the pixel in the resulting image.

15. The method of claim 13, wherein at least one of the third image or the fourth image includes infrared intensity information or ultraviolet intensity information.

16. The method of claim 13, wherein a beam splitter directs light from a photographic scene onto the first image sensor and the second image sensor simultaneously.

17. A computer program product comprising computer executable instructions stored on a non-transitory computer readable medium that when executed by a processor instruct the processor to:
receive a first image and a second image from a first image sensor, wherein the first image sensor detects wavelengths of a visible spectrum, and at least one of the first image or the second image is sampled under strobe illumination using a strobe unit;

receive a third image and a fourth image from a second image sensor, wherein the second image sensor detects wavelengths of a non-visible spectrum, and at least one of the third image or the fourth image is sampled under strobe illumination using the strobe unit; and generate, using an image processing subsystem, a resulting image by combining at least three of: the first image, the second image, the third image, or the fourth image.

18. The computer program product of claim 17, wherein at least one of the third image or the fourth image includes infrared intensity information or ultraviolet intensity information.

19. The computer program product of claim 17, wherein a beam splitter directs light from a photographic scene onto the first image sensor and the second image sensor simultaneously.

* * * * *